United States Patent
Wu et al.

(10) Patent No.: US 10,362,043 B2
(45) Date of Patent: Jul. 23, 2019

(54) METHOD AND APPARATUS FOR DETECTING MAN-IN-THE-MIDDLE ATTACK

(71) Applicant: Huawei Technologies Co., Ltd., Shenzhen (CN)

(72) Inventors: Rong Wu, Shenzhen (CN); Chengdong He, Dongguan (CN); Lu Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 15/270,722

(22) Filed: Sep. 20, 2016

(65) Prior Publication Data

US 2017/0012997 A1    Jan. 12, 2017

Related U.S. Application Data

(63) Continuation of application No. PCT/CN2015/072300, filed on Feb. 5, 2015.

(30) Foreign Application Priority Data

Mar. 21, 2014  (CN) .......................... 2014 1 0106876

(51) Int. Cl.
*H04L 29/00* (2006.01)
*H04L 29/06* (2006.01)
*H04W 12/12* (2009.01)

(52) U.S. Cl.
CPC .............. *H04L 63/14* (2013.01); *H04L 63/12* (2013.01); *H04L 63/1441* (2013.01); *H04W 12/12* (2013.01)

(58) Field of Classification Search
CPC ...... H04L 63/14; H04L 63/12; H04L 63/1441
(Continued)

(56) References Cited

U.S. PATENT DOCUMENTS

2006/0197702 A1    9/2006  Jones
2012/0182929 A1    7/2012  Chen et al.
(Continued)

FOREIGN PATENT DOCUMENTS

CN     1835462 A    9/2006
CN   102740289 A   10/2012
(Continued)

OTHER PUBLICATIONS

Foreign Communication From a Counterpart Application, Chinese Application No. 201410106876.4, Chinese Office Action dated Nov. 1, 2017, 12 pages.
(Continued)

*Primary Examiner* — Brandon S Hoffman
*Assistant Examiner* — Michael D Anderson
(74) *Attorney, Agent, or Firm* — Conley Rose, P.C.

(57) ABSTRACT

A method and an apparatus for detecting a man-in-the-middle attack, where the method includes receiving, by a macro evolved Node B (MeNB), a first check request message sent by a secondary evolved Node B (SeNB), where the first check request message includes first identifier information and a first data packet count value, generating a second check request message according to the first identifier information, sending the second check request message to a user terminal, receiving a first check response message generated by the user terminal according to the second check request message, where the first check response message includes second identifier information and a second data packet count value, determining, by the MeNB, that the man-in-the-middle attack exists between the SeNB and the user terminal when the first data packet count value is different from the second data packet count value.

20 Claims, 16 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2014/0307872 | A1* | 10/2014 | Heo | .................. H04W 52/0251 380/270 |
| 2014/0308921 | A1 | 10/2014 | Zhang | |
| 2014/0341188 | A1 | 11/2014 | Chang et al. | |
| 2015/0126154 | A1 | 5/2015 | Yang | |
| 2015/0208235 | A1* | 7/2015 | Ingale | .................. H04W 12/04 455/411 |

FOREIGN PATENT DOCUMENTS

| | | |
|---|---|---|
| CN | 102904883 A | 1/2013 |
| CN | 103188663 A | 7/2013 |
| CN | 103188681 A | 7/2013 |
| WO | 2009151372 A2 | 12/2009 |
| WO | 2013111905 A1 | 8/2013 |

OTHER PUBLICATIONS

"3rd Generation Partnership Project; Technical Specification Group Core Network and Terminals; Mobile radio interface signalling layer 3; General aspects (Release 12)," 3GPP TS 24.007, V12.0.0, Technical Specification, Jun. 2013, 149 pages.

"3rd Generation Partnership Project; Technical Specification Group Services and System Aspects; 3GPP System Architecture Evolution (SAE); Security architecture (Release 12)," 3GPP TS 33.401, V12.10.0, Technical Specification, Dec. 2013, 121 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.0.0, Technical Specification, Dec. 2013, 208 pages.

"Draft: Reply LS on Security aspects of protocol architectures for small cell enhancements," 3GPP RAN WG2 Meeting #85, R2-14XXXX, Feb. 10-14, 2014, 4 pages.

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)," 3GPP TR 36.842, V0.4.2, Technical Report, Nov. 2013, 73 pages.

"Periodic Local Authentication," Change Request, 3GPP TSG-SA WG3 Security Meeting #54, S3-090134, Jan. 19-23, 2009, 2 pages.

Huawei, et al., "Security for SCE arc. 1A," 3GPP TSG SA WG3 (Security) Meeting #74, S3-140026, Jan. 20-24, 2014, 8 pages.

"Response to SP-130720: Reply LS on Small Cell Enhancement work in RAN," 3GPP TSG SA WG3 (Security) Meeting #74, S3-140028, Revision of 53-13abcd, Jan. 20-24, 2014, 1 pages.

Foreign Communication From a Counterpart Application, European Application No. 15765878.2, Extended European Search Report dated Nov. 14, 2016, 11 pages.

Foreign Communication From a Counterpart Application, PCT Application No. PCT/CN2015/072300, English Translation of International Search Report dated Apr. 29, 2015, 2 pages.

Foreign Communication From a Counterpart Application, PCT Application No. PCT/CN2015/072300, English Translation of Written Opinion dated Apr. 29, 2015, 5 pages.

"3rd Generation Partnership Project; Technical Specification Group Services and System Aspects; 3GPP System Architecture Evolution (SAE): Security Architecture; (Release 8)," 3GPP TS 33.401, V8.2.0, Dec. 2008, 54 pages.

Foreign Communication From a Counterpart Application, Chinese Application No. 201810276321.2, Chinese Office Action dated Dec. 3, 2018, 9 pages.

Foreign Communication From a Counterpart Application, Chinese Application No. 201810277935.2, Chinese Search Report dated Jan. 25, 2019, 2 pages.

Foreign Communication From a Counterpart Application, Chinese Application No. 201810277935.2, Chinese Office Action dated Jan. 30, 2019, 5 pages.

Machine Translation and Abstract of Chinese Publication No. CN102904883, Jan. 30, 2013, 12 pages.

Foreign Communication From a Counterpart Application, Chinese Application No. 201810276321.2, Chinese Office Action dated Jan. 9, 2019, 5 pages.

NEC, "Inclusion of description for dual connectivity (related with X2 Interface)," R3-140225, XP050738666, 3GPP Draft; Feb. 2014, 14 pages.

NEC Corporation, "RRC messages over X2 for DC" R2-140619, XP050791932, 3GPP Draft; Feb. 2014, 6 pages.

Foreign Communication From a Counterpart Application, European Application No. 15765878.2, European Office Action dated Mar. 18, 2019, 7 pages.

* cited by examiner

METHOD AND APPARATUS FOR DETECTING MAN-IN-THE-MIDDLE ATTACK

CROSS-REFERENCE TO RELATED APPLICATIONS

This application is a continuation of International Application No. PCT/CN2015/072300 filed on Feb. 5, 2015, which claims priority to Chinese Patent Application No. 201410106876.4 filed on Mar. 21, 2014, both of which are hereby incorporated by reference in their entireties.

TECHNICAL FIELD

The present disclosure relates to the communications field, and in particular, to a method and an apparatus for detecting a man-in-the-middle attack.

BACKGROUND

As information rapidly develops and network resources are increasingly rich, a service capability of a master evolved Node B (master eNodeB, Master eNB, or MeNB) cannot meet a user requirement due to limited air interface bandwidth. In addition, expensive base station construction costs and high radio frequency also increase difficulty in base-station indoor coverage. Therefore, to improve a throughput of user plane data, a low-cost secondary eNodeB (Secondary eNB, or SeNB) is combined with the MeNB in networking, and the SeNB offloads partial traffic of the MeNB, which can resolve the foregoing problem. The master eNodeB is a macro eNodeB (Marco eNB/cell), the secondary eNodeB is a small cell, and the small cell includes a pico cell/eNB and a femto cell/eNB, and may be referred to as a pico base station or a femto base station.

A user terminal (e.g., User Equipment (UE)) simultaneously maintains dual connectivity with the MeNB and the SeNB, the UE and the MeNB perform air-interface control plane signaling interworking with each other, and the UE simultaneously transmits user plane data to the MeNB and the SeNB. Because the user plane data between the UE and the SeNB is protected only by means of encryption processing, a man-in-the-middle attack may exist between the UE and the SeNB, and consequently there is a risk that the user plane data of interworking between the UE and the SeNB is inserted, tampered with, or forwarded, causing a user service to be fraudulently used and lawful interception to be unreliable, and the like.

In an existing communications network, after identifying a count value (e.g., Packet Data Convergence Protocol (PDCP) count) of sent and received packets of a bearer between the UE and the eNB, the UE reports the count value to the eNB such that the eNB detects whether a man-in-the-middle attack exists. A specific process is as follows. The eNB sends a counter check message to the UE, and adds multiple first PDCP count values corresponding to all bearers between the UE and the eNB to a counter check request message. The UE separately determines by comparison whether each first PDCP count value is the same as a stored second PDCP count value of each bearer. The UE sends a check response message to the eNB if the first PDCP count value of each of the bearers is the same as the second PDCP count value. The check response message does not carry any PDCP count value, or the UE sends a check response message to the eNB if the first PDCP count values of all the bearers are different from the second PDCP count value. The check response message carries different second PDCP count values, and the eNB performs check processing on the check response message, and the detection procedure ends if the check response message does not carry any PDCP count value, and the eNB determines that no man-in-the-middle attack exists between the eNB and the UE, or the eNB determines that a man-in-the-middle attack exists between the eNB and the UE if the check response message carries the different second PDCP count values such that the eNB sends a notification message to a mobility management entity (MME) or an operation and maintenance (O&M) server, and the MME or the O&M server performs subsequent processing and may release the bearer between the UE and the eNB.

It can be learned from the foregoing description that whether a man-in-the-middle attack exists between the UE and the eNB is detected by means of air-interface control plane signaling interworking, but in a scenario in which the UE maintains dual connectivity with the MeNB and the SeNB, no air-interface control plane signaling interworking occurs between the SeNB and the UE, and consequently in this scenario, the SeNB cannot detect whether a man-in-the-middle attack exists between the SeNB and the UE.

SUMMARY

Embodiments of the present disclosure provide a method and an apparatus for detecting a man-in-the-middle attack such that in a scenario in which UE maintains dual connectivity with an MeNB and an SeNB, it can be detected whether the SeNB and the UE are attacked by a man-in-the-middle.

In a first aspect, an embodiment of the present disclosure provides a method for detecting a man-in-the-middle attack, and the method includes receiving, by an MeNB, a first check request message sent by an SeNB, where the first check request message includes first identifier information of an evolved random access bearer (ERAB) and a first data packet count value corresponding to the first identifier information, generating, by the MeNB, a second check request message according to the first identifier information, and sending the second check request message to a user terminal, where the second check request message includes first indication information, the first indication information is used to instruct the user terminal to obtain second identifier information that matches the first identifier information, and a second data packet count value corresponding to the second identifier information, and the second identifier information is a data radio bearer (DRB) corresponding to the ERAB, receiving, by the MeNB, a first check response message generated by the user terminal according to the second check request message, where the first check response message includes the second identifier information and the second data packet count value, and determining, by the MeNB when the first data packet count value corresponding to the first identifier information is the same as the second data packet count value corresponding to the second identifier information, that no man-in-the-middle attack exists between the SeNB and the user terminal, or determining, by the MeNB when the first data packet count value corresponding to the first identifier information is different from the second data packet count value corresponding to the second identifier information, that a man-in-the-middle attack exists between the SeNB and the user terminal.

With reference to the first aspect, in a first possible implementation manner, the first check request message further includes an identifier of the SeNB, and generating, by the MeNB, a second check request message according to the first identifier information, and sending the second check request message to a user terminal, where the second check request message includes first indication information, and the first indication information is used to enable the user terminal to obtain second identifier information that matches the first identifier information, and a second data packet count value corresponding to the second identifier information includes generating, by the MeNB, the second check request message according to the first identifier information and the identifier of the SeNB, and sending the second check request message to the user terminal such that the user terminal obtains, according to the second check request message, the second identifier information that matches the first identifier information and the identifier of the SeNB, and the second data packet count value corresponding to the second identifier information.

With reference to the first aspect or the first possible implementation manner of the first aspect, in a second possible implementation manner, the first check request message includes at least two pieces of first identifier information and at least two corresponding first data packet count values, and the first check response message includes at least two pieces of second identifier information and at least two corresponding second data packet count values, and determining, by the MeNB when the first data packet count value corresponding to the first identifier information is different from the second data packet count value corresponding to the second identifier information, that a man-in-the-middle attack exists between the SeNB and the user terminal includes determining, by the MeNB when a first data packet count value corresponding to at least one piece of first identifier information is different from the second data packet count value corresponding to the second identifier information that matches the first identifier information, that a man-in-the-middle attack exists between the SeNB and the user terminal, or determining, by the MeNB when the first data packet count value corresponding to the first identifier information is the same as the second data packet count value corresponding to the second identifier information, that no man-in-the-middle attack exists between the SeNB and the user terminal includes determining, by the MeNB when the first data packet count values corresponding to all the first identifier information are the same as the second data packet count value corresponding to the second identifier information that matches the first identifier information, that no man-in-the-middle attack exists between the SeNB and the user terminal.

With reference to the first aspect or the first or the second possible implementation manner of the first aspect, in a third possible implementation manner, after the MeNB determines that no man-in-the-middle attack exists between the SeNB and the user terminal, the method further includes sending, by the MeNB, a second check response message to the SeNB, where the second check response message includes second indication information, and the second indication information is used to indicate that no man-in-the-middle attack exists between the SeNB and the UE.

With reference to the first aspect or the first, the second, or the third possible implementation manner of the first aspect, in a fourth possible implementation manner, after the MeNB determines that a man-in-the-middle attack exists between the SeNB and the user terminal, the method further includes sending, by the MeNB, an exception report to an MME or an O&M server.

With reference to the first aspect or the first, the second, the third, or the fourth possible implementation manner of the first aspect, in a fifth possible implementation manner, after the MeNB determines that a man-in-the-middle attack exists between the SeNB and the user terminal, the method further includes sending, by the MeNB, a third check response message to the SeNB, where the third check response message includes third indication information, and the third indication information is used to indicate that a man-in-the-middle attack exists between the SeNB and the user terminal.

In a second aspect, an embodiment of the present disclosure provides a method for detecting a man-in-the-middle attack, and the method includes sending, by an SeNB, a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal, receiving, by the SeNB, the check response message sent by the MeNB, and determining, by the SeNB according to second indication information, that no man-in-the-middle attack exists between the SeNB and the user terminal when the check response message is a second check response message and the second check response message includes the second indication information, or determining, by the SeNB according to third indication information, that a man-in-the-middle attack exists between the SeNB and the user terminal, and taking a preset measure for processing when the check response message is a third check response message and the third check response message includes the third indication information.

With reference to the second aspect, in a first possible implementation manner of the second aspect, the first check request message further includes an identifier of the SeNB, and sending, by an SeNB, a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal includes sending, by the SeNB, the first check request message to the MeNB, where the first check request message includes the identifier of the SeNB, the first identifier information of the ERAB, and the first data packet count value corresponding to the first identifier information, and the first check request message is used to enable the MeNB to generate the second check request message according to the first identifier information and the identifier of the SeNB, and send the second check request message to the user terminal.

In a third aspect, an embodiment of the present disclosure provides a method for detecting a man-in-the-middle attack, and the method includes receiving, by a user terminal, a second check request message sent by the MeNB, where the second check request message includes second identifier information corresponding to first identifier information of an ERAB, and the second identifier information is a DRB corresponding to the ERAB, obtaining, by the user terminal, the second identifier information corresponding to the first identifier information, and a second data packet count value corresponding to the second identifier information, and sending, by the user terminal, the second identifier information and the second data packet count value corresponding to the second identifier information to the MeNB such that the MeNB determines, according to a first data packet count value and the second data packet count value, whether a man-in-the-middle attack exists.

In a fourth aspect, an embodiment of the present disclosure provides a method for detecting a man-in-the-middle attack, and the method includes receiving, by an MeNB, a first check request message sent by an SeNB, where the first check request message includes first identifier information of an ERAB and a first data packet count value corresponding to the first identifier information, generating, by the MeNB, a second check request message according to the first identifier information and the first data packet count value corresponding to the first identifier information, and sending the second check request message to a user terminal, where the second check request message includes first indication information, the first indication information is used to instruct the user terminal to obtain second identifier information that matches the first identifier information, and a second data packet count value corresponding to the second identifier information, and determine by comparison whether the first data packet count value corresponding to the first identifier information is the same as the second data packet count value corresponding to the second identifier information, and the second identifier information is a DRB corresponding to the ERAB, and receiving, by the MeNB, a check response message generated by the user terminal according to the second check request message, and sending the check response message to the SeNB such that the SeNB performs processing according to the response message.

With reference to the fourth aspect, in a first possible implementation manner of the fourth aspect, the first check request message further includes an identifier of the SeNB, and generating, by the MeNB, a second check request message according to the first identifier information and the first data packet count value corresponding to the first identifier information, and sending the second check request message to a user terminal, where the second check request message includes first indication information, and the first indication information is used to instruct the user terminal to obtain second identifier information that matches the first identifier information, and a second data packet count value corresponding to the second identifier information, and determine by comparison whether the first data packet count value corresponding to the first identifier information is the same as the second data packet count value corresponding to the second identifier information includes generating, by the MeNB, the second check request message according to the identifier of the SeNB, the first identifier information, and the first data packet count value corresponding to the first identifier information, and sending the second check request message to the user terminal, where the second check request message includes the first indication information, and the first indication information is used to instruct the user terminal to obtain the second identifier information that matches the first identifier information and the identifier of the SeNB, and the second data packet count value corresponding to the second identifier information, and determine by comparison whether the first data packet count value corresponding to the first identifier information is the same as the second data packet count value corresponding to the second identifier information.

With reference to the fourth aspect or the first possible implementation manner of the fourth aspect, in a second possible implementation manner of the fourth aspect, after the receiving, by the MeNB, a check response message generated by the user terminal according to the second check request message, and sending the check response message to the SeNB such that the SeNB performs processing according to the response message, the method further includes sending, by the MeNB, the exception report to an MME or an O&M server.

In a fifth aspect, an embodiment of the present disclosure provides a method for detecting a man-in-the-middle attack, and the method includes sending, by an SeNB, a first check request message to an MeNB, where the first check request message includes first indication information, and the first indication information is used to instruct the MeNB to send a second check request message to a user terminal, receiving, by the SeNB, a check response message sent by the MeNB, determining, by the SeNB according to the check response message, whether a man-in-the-middle attack exists, and taking, by the SeNB, a preset measure for processing and sending an exception report to the MeNB when the man-in-the-middle attack exists.

In a sixth aspect, an embodiment of the present disclosure provides a method for detecting a man-in-the-middle attack, and the method includes receiving, by a user terminal, a second check request message sent by an MeNB, where the second check request message includes second identifier information corresponding to first identifier information of an ERAB, and a first data packet count value corresponding to the first identifier information, and the second identifier information is a DRB corresponding to the ERAB, obtaining, by the user terminal, the second identifier information corresponding to the first identifier information, and a second data packet count value corresponding to the second identifier information, determining, by the user terminal according to the first data packet count value corresponding to the first identifier information, and the second data packet count value corresponding to the second identifier information, whether a man-in-the-middle attack exists between an SeNB and the user terminal, and generating, by the user terminal, a check response message according to a result of the determining, and sending the check response message to the MeNB.

With reference to the sixth aspect, in a first possible implementation manner of the sixth aspect, determining, by the user terminal according to the first data packet count value corresponding to the first identifier information and the second data packet count value corresponding to the second identifier information, whether a man-in-the-middle attack exists between an SeNB and the user terminal includes determining, by the user terminal when the first data packet count value corresponding to the first identifier information is the same as the second data packet count value corresponding to the second identifier information, that no man-in-the-middle attack exists between the SeNB and the user terminal, or determining, by the user terminal when the first data packet count value corresponding to the first identifier information is different from the second data packet count value corresponding to the second identifier information, that a man-in-the-middle attack exists between the SeNB and the user terminal.

In a seventh aspect, an embodiment of the present disclosure provides a method for detecting a man-in-the-middle attack, and the method includes receiving, by an MeNB, a first check request message sent by an SeNB, generating, by the MeNB, a second check request message according to the first check request message, and sending the second check request message to a user terminal, where the second check request message includes first indication information, and the first indication information is used to instruct the user terminal to obtain first identifier information of a DRB and a first data packet count value corresponding to the first identifier information, and receiving, by the MeNB, a check response message generated by the user terminal according to the second check request message, and sending the check response message to the SeNB, where the response message includes the first identifier information and the first data packet count value corresponding to the first identifier information such that the SeNB determines, according to the first data packet count value, whether a man-in-the-middle attack exists.

With reference to the seventh aspect, in a first possible implementation manner of the seventh aspect, the first check request message further includes an identifier of the SeNB, and generating, by the MeNB, a second check request message according to the first check request message, and sending the second check request message to a user terminal, where the second check request message includes first indication information, and the first indication information is used to instruct the user terminal to obtain first identifier information of a DRB and a first data packet count value corresponding to the first identifier information includes generating, by the MeNB, the second check request message according to the identifier of the SeNB and the first check request message, and sending the second check request message to the user terminal, where the second check request message includes the first indication information, and the first indication information is used to instruct the user terminal to obtain the first identifier information of the DRB and the first data packet count value corresponding to the first identifier information.

With reference to the seventh aspect or the first possible implementation manner of the seventh aspect, in a second possible implementation manner of the seventh aspect, after receiving, by the MeNB, a check response message generated by the user terminal according to the second check request message, and sending the check response message to the SeNB, the method further includes sending, by the MeNB, an exception report to an MME or an O&M server when the MeNB receives the exception report sent by the SeNB.

In an eighth aspect, an embodiment of the present disclosure provides a method for detecting a man-in-the-middle attack, and the method includes sending, by an SeNB, a first check request message to an MeNB, where the first check request message is used to enable the MeNB to generate a second check request message according to the first check request message, and send the second check request message to a user terminal, receiving, by the SeNB, a check response message sent by the MeNB, where the check response message includes first identifier information of a DRB and a first data packet count value corresponding to the first identifier information, obtaining, by the SeNB according to the first identifier information, second identifier information that matches the first identifier information, and a second data packet count value corresponding to the second identifier information, where the second identifier information is an ERAB corresponding to the DRB, determining, by the SeNB according to the first data packet count value and the second data packet count value, whether a man-in-the-middle attack exists, and taking, by the SeNB, a preset measure for processing and sending an exception report to the MeNB when the man-in-the-middle attack exists.

With reference to the eighth aspect, in a first possible implementation manner of the eighth aspect, determining, by the SeNB according to the first data packet count value and the second data packet count value, whether a man-in-the-middle attack exists includes determining, by the SeNB when the first data packet count value corresponding to the first identifier information is the same as the second data packet count value corresponding to the second identifier information, that no man-in-the-middle attack exists between the SeNB and the user terminal, or determining, by the SeNB when the first data packet count value corresponding to the first identifier information is different from the second data packet count value corresponding to the second identifier information, that a man-in-the-middle attack exists between the SeNB and the user terminal.

In a ninth aspect, an embodiment of the present disclosure provides a method for detecting a man-in-the-middle attack, and the method includes receiving, by a user terminal, a second check request message sent by an MeNB, obtaining, by the user terminal according to the second check request message, first identifier information of a DRB and a first data packet count value corresponding to the first identifier information, and sending, by the user terminal, a check response message to the MeNB, where the check response message includes the first identifier information and the first data packet count value corresponding to the first identifier information such that the MeNB sends the check response message to an SeNB, and the SeNB determines, according to the first data packet count value, whether a man-in-the-middle attack exists between the SeNB and the user terminal.

In a tenth aspect, an embodiment of the present disclosure provides an apparatus for detecting a man-in-the-middle attack, and the apparatus includes a receiving unit configured to receive a first check request message sent by an SeNB, where the first check request message includes first identifier information of an ERAB and a first data packet count value corresponding to the first identifier information, a sending unit configured to generate a second check request message according to the first identifier information, and send the second check request message to a user terminal, where the second check request message includes first indication information, the first indication information is used to instruct the user terminal to obtain second identifier information that matches the first identifier information, and a second data packet count value corresponding to the second identifier information, and the second identifier information is a DRB corresponding to the ERAB, where the receiving unit is further configured to receive a first check response message generated by the user terminal according to the second check request message, where the first check response message includes the second identifier information and the second data packet count value, and a judging unit configured to determine that no man-in-the-middle attack exists between the SeNB and the user terminal when the first data packet count value corresponding to the first identifier information is the same as the second data packet count value corresponding to the second identifier information, or determine that a man-in-the-middle attack exists between the SeNB and the user terminal when the first data packet count value corresponding to the first identifier information is different from the second data packet count value corresponding to the second identifier information.

With reference to the tenth aspect, in a first implementation manner of the tenth aspect, the first check request message received by the receiving unit further includes an identifier of the SeNB, and the sending unit is further configured to generate the second check request message according to the first identifier information and the identifier of the SeNB, and send the second check request message to the user terminal such that the user terminal obtains, according to the second check request message, the second identifier information that matches the first identifier information and the identifier of the SeNB, and the second data packet count value corresponding to the second identifier information.

With reference to the tenth aspect or the first possible implementation manner of the tenth aspect, in a second possible implementation manner, the first check request message received by the receiving unit includes at least two pieces of first identifier information and at least two corresponding first data packet count values, and the first check response message received by the receiving unit includes at least two pieces of second identifier information and at least two corresponding second data packet count values, and the judging unit is further configured to determine that a man-in-the-middle attack exists between the SeNB and the user terminal when a first data packet count value corresponding to at least one piece of first identifier information is different from the second data packet count value corresponding to the second identifier information that matches the first identifier information, or determine that no man-in-the-middle attack exists between the SeNB and the user terminal when the first data packet count values corresponding to all the first identifier information are the same as the second data packet count value corresponding to the second identifier information that matches the first identifier information.

With reference to the tenth aspect or the first or the second possible implementation manner of the tenth aspect, in a third possible implementation manner, the sending unit is further configured to send a second check response message to the SeNB, where the second check response message includes second indication information, and the second indication information is used to indicate that no man-in-the-middle attack exists between the SeNB and the UE.

With reference to the tenth aspect or the first or the second or the third possible implementation manner of the tenth aspect, in a fourth possible implementation manner, the sending unit is further configured to send an exception report to an MME or an O&M server.

With reference to the tenth aspect or the first or the second or the third or the fourth possible implementation manner of the tenth aspect, in a fifth possible implementation manner of the tenth aspect, the sending unit is further configured to send a third check response message to the SeNB, where the third check response message includes third indication information, and the third indication information is used to indicate that a man-in-the-middle attack exists between the SeNB and the user terminal.

In an eleventh aspect, an embodiment of the present disclosure provides an apparatus for detecting a man-in-the-middle attack, and the apparatus includes a sending unit configured to send a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal, a receiving unit configured to receive the check response message sent by the MeNB, and a determining unit configured to determine, according to the second indication information, that no man-in-the-middle attack exists between the SeNB and the user terminal when the check response message is a second check response message and the second check response message includes second indication information, or determine, according to the third indication information, that a man-in-the-middle attack exists between the SeNB and the user terminal, and take a preset measure for processing when the check response message is a third check response message and the third check response message includes third indication information.

With reference to the eleventh aspect, in a first possible implementation manner of the eleventh aspect, the first check request message sent by the sending unit further includes an identifier of the SeNB, and the sending unit is further configured to send the first check request message to the MeNB, where the first check request message includes the identifier of the apparatus, the first identifier information of the ERAB, and the first data packet count value corresponding to the first identifier information, and the first check request message is used to enable the MeNB to generate the second check request message according to the first identifier information and the identifier of the apparatus, and send the second check request message to the user terminal.

In a twelfth aspect, an embodiment of the present disclosure provides an apparatus for detecting a man-in-the-middle attack, and the apparatus includes a receiving unit configured to receive a second check request message sent by the MeNB, where the second check request message includes second identifier information corresponding to first identifier information of an ERAB, and the second identifier information is a DRB corresponding to the ERAB, an obtaining unit configured to obtain the second identifier information corresponding to the first identifier information, and a second data packet count value corresponding to the second identifier information, and a sending unit configured to send the second identifier information and the second data packet count value corresponding to the second identifier information to the MeNB such that the MeNB determines, according to a first data packet count value and the second data packet count value, whether a man-in-the-middle attack exists.

In a thirteenth aspect, an embodiment of the present disclosure provides an apparatus for detecting a man-in-the-middle attack, and the apparatus includes a receiving unit configured to receive a first check request message sent by an SeNB, where the first check request message includes first identifier information of an ERAB and a first data packet count value corresponding to the first identifier information, and a sending unit configured to generate a second check request message according to the first identifier information and the first data packet count value corresponding to the first identifier information, and send the second check request message to a user terminal, where the second check request message includes first indication information, the first indication information is used to instruct the user terminal to obtain second identifier information that matches the first identifier information, and a second data packet count value corresponding to the second identifier information, and determine by comparison whether the first data packet count value corresponding to the first identifier information is the same as the second data packet count value corresponding to the second identifier information, and the second identifier information is a DRB corresponding to the ERAB, where the receiving unit is further configured to receive a check response message generated by the user terminal according to the second check request message, and send the check response message to the SeNB such that the SeNB performs processing according to the response message.

With reference to the thirteenth aspect, in a first possible implementation manner of the thirteenth aspect, the first check request message received by the receiving unit further includes an identifier of the SeNB, and the sending unit is further configured to generate the second check request message according to the identifier of the SeNB, the first identifier information, and the first data packet count value corresponding to the first identifier information, and send the second check request message to the user terminal, where the second check request message includes the first indication information, and the first indication information is used to instruct the user terminal to obtain the second identifier information that matches the first identifier information and the identifier of the SeNB, and the second data packet count value corresponding to the second identifier information, and determine by comparison whether the first data packet count value corresponding to the first identifier information is the same as the second data packet count value corresponding to the second identifier information.

With reference to the thirteenth aspect or the first possible implementation manner of the thirteenth aspect, in a second possible implementation manner, the sending unit is further configured to send an exception report to an MME or an O&M server when the receiving unit receives the exception report sent by the SeNB.

In a fourteenth aspect, an embodiment of the present disclosure provides an apparatus for detecting a man-in-the-middle attack, and the apparatus includes a sending unit configured to send a first check request message to an MeNB, where the first check request message includes first indication information, and the first indication information is used to instruct the MeNB to send a second check request message to a user terminal, a receiving unit configured to receive a check response message sent by the MeNB, and a determining unit configured to determine, according to the check response message, whether a man-in-the-middle attack exists, where the sending unit is further configured to take a preset measure for processing and send an exception report to the MeNB when the determining unit determines that the man-in-the-middle attack exists.

In a fifteenth aspect, an embodiment of the present disclosure provides an apparatus for detecting a man-in-the-middle attack, and the apparatus includes a receiving unit configured to receive a second check request message sent by an MeNB, where the second check request message includes second identifier information corresponding to first identifier information of an ERAB, and a first data packet count value corresponding to the first identifier information, and the second identifier information is a DRB corresponding to the ERAB, an obtaining unit configured to obtain the second identifier information corresponding to the first identifier information, and a second data packet count value corresponding to the second identifier information, a judging unit configured to determine, according to the first data packet count value corresponding to the first identifier information, and the second data packet count value corresponding to the second identifier information, whether a man-in-the-middle attack exists between an SeNB and the apparatus, and a sending unit configured to generate a check response message according to a result determined by the judging unit, and send the check response message to the MeNB.

With reference to the fifteenth aspect, in a first possible implementation manner of the fifteenth aspect, a determining unit configured to determine that no man-in-the-middle attack exists between the SeNB and the apparatus when the first data packet count value corresponding to the first identifier information is same as the second data packet count value corresponding to the second identifier information, or determine that a man-in-the-middle attack exists between the SeNB and the apparatus when the first data packet count value corresponding to the first identifier information is different from the second data packet count value corresponding to the second identifier information.

In a sixteenth aspect, an embodiment of the present disclosure provides an apparatus for detecting a man-in-the-middle attack, and the apparatus includes a receiving unit configured to receive a first check request message sent by an SeNB, and a sending unit configured to generate a second check request message according to the first check request message, and send the second check request message to a user terminal, where the second check request message includes first indication information, and the first indication information is used to instruct the user terminal to obtain first identifier information of a DRB and a first data packet count value corresponding to the first identifier information, where the receiving unit is further configured to receive a check response message generated by the user terminal according to the second check request message, and send the check response message to the SeNB, where the response message includes the first identifier information and the first data packet count value corresponding to the first identifier information such that the SeNB determines, according to the first data packet count value, whether a man-in-the-middle attack exists.

With reference to the sixteenth aspect, in a first possible implementation manner of the sixteenth aspect, the first check request message received by the receiving unit further includes an identifier of the SeNB, and the sending unit is further configured to generate the second check request message according to the identifier of the SeNB and the first check request message, and send the second check request message to the user terminal, where the second check request message includes the first indication information, and the first indication information is used to instruct the user terminal to obtain the first identifier information of the DRB and the first data packet count value corresponding to the first identifier information.

With reference to the sixteenth aspect or the first possible implementation manner of the sixteenth aspect, in a second possible implementation manner, the sending unit is further configured to send the exception report to an MME or an O&M server when the receiving unit receives an exception report sent by the SeNB.

In a seventeenth aspect, an embodiment of the present disclosure provides an apparatus for detecting a man-in-the-middle attack, and the apparatus includes a sending unit configured to send a first check request message to an MeNB, where the first check request message is used to enable the MeNB to generate a second check request message according to the first check request message, and send the second check request message to a user terminal, a receiving unit configured to receive a check response message sent by the MeNB, where the check response message includes first identifier information of a DRB and a first data packet count value corresponding to the first identifier information, an obtaining unit configured to obtain, according to the first identifier information, second identifier information that matches the first identifier information, and a second data packet count value corresponding to the second identifier information, where the second identifier information is an ERAB corresponding to the DRB, and a judging unit configured to determine, according to the first data packet count value and the second data packet count value, whether a man-in-the-middle attack exists, where the sending unit is further configured to take a preset measure for processing and send an exception report to the MeNB when the judging unit determines that the man-in-the-middle attack exists.

With reference to the seventeenth aspect, in a first possible implementation manner of the seventeenth aspect, the judging unit is further configured to determine that no man-in-the-middle attack exists between the apparatus and the user terminal when the first data packet count value corresponding to the first identifier information is the same as the second data packet count value corresponding to the second identifier information, or determine that a man-in-the-middle attack exists between the apparatus and the user terminal when the first data packet count value corresponding to the first identifier information is different from the second data packet count value corresponding to the second identifier information.

In an eighteenth aspect, an embodiment of the present disclosure provides an apparatus for detecting a man-in-the-middle attack, and the apparatus includes a receiving unit configured to receive a second check request message sent by an MeNB, an obtaining unit configured to obtain, according to the second check request message, first identifier information of a DRB and a first data packet count value corresponding to the first identifier information, and a sending unit configured to send a check response message to the MeNB, where the check response message includes the first identifier information and the first data packet count value corresponding to the first identifier information such that the MeNB sends the check response message to an SeNB, and the SeNB determines, according to the first data packet count value, whether a man-in-the-middle attack exists between the SeNB and the apparatus.

In conclusion, according to the method and the apparatus for detecting a man-in-the-middle attack provided in the embodiments of the present disclosure, an SeNB initiates detection of a man-in-the-middle attack, an MeNB receives a first data packet count value that is of a bearer between the SeNB and UE and is sent by the SeNB, and requires, according to the first data packet count value sent by the SeNB, the UE to report a second data packet count value of a bearer between the UE and the SeNB, and when the first data packet count value is same as the second data packet count value, the MeNB determines that no man-in-the-middle attack exists between the SeNB and the user terminal, and notifies the SeNB. Therefore, in a scenario in which the SeNB offloads traffic of the MeNB, the MeNB, the SeNB, and the UE all can participate in detection of a man-in-the-middle attack.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

For better understanding of the embodiments of the present disclosure, the following uses specific embodiments to provide further explanations with reference to the accompanying drawings, and the embodiments of the present disclosure constitute no limitation to the present disclosure.

Embodiment 1

Figure 1:
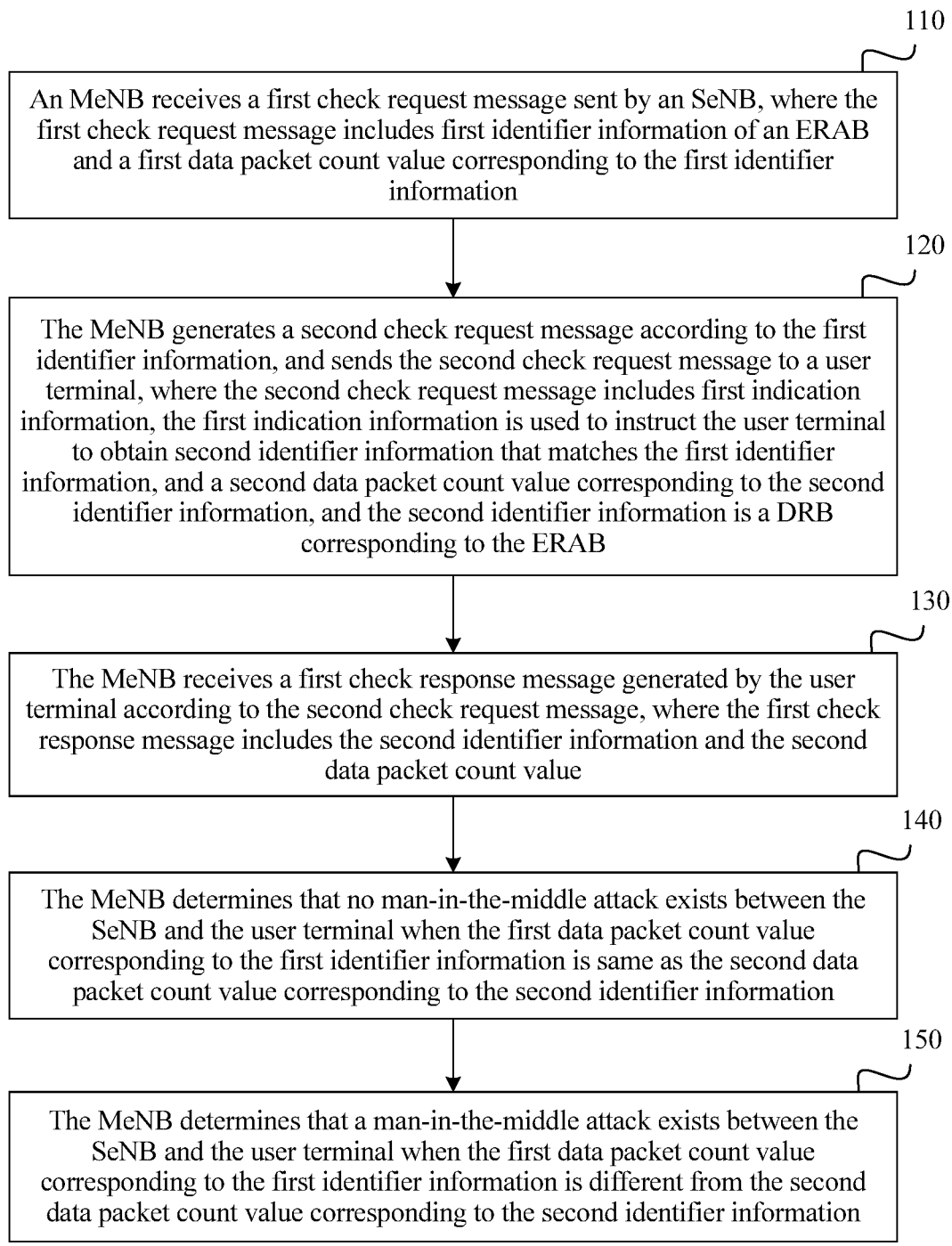
FIG. 1 is a flowchart of a method for detecting a man-in-the-middle attack according to Embodiment 1 of the present disclosure.

The following uses FIG. 1 as an example to describe in detail a method for detecting a man-in-the-middle attack provided in Embodiment 1 of the present disclosure. FIG. 1 is a flowchart of a method for detecting a man-in-the-middle attack according to Embodiment 1 of the present disclosure, and this embodiment of the present disclosure is executed by an MeNB. As shown in FIG. 1, this embodiment includes the following steps.

Step 110: An MeNB receives a first check request message sent by an SeNB, where the first check request message includes first identifier information of an ERAB and a first data packet count value corresponding to the first identifier information.

The SeNB starts detection of a bearer between the SeNB and UE, and the SeNB sends the first check request message to the MeNB, where the first check request message includes the first identifier information of the ERAB between the SeNB and the UE and the first data packet count value corresponding to the first identifier information.

The MeNB receives the first check request message.

The first data packet count value reflects a count, obtained by the SeNB, of sent and received data packets of the bearer between the SeNB and the UE.

It may be understood that there are multiple bearers between the SeNB and the UE, and each bearer has one piece of first identifier information. In this embodiment of the present disclosure, the first check request message may include at least one piece of first identifier information corresponding to a bearer, and at least one first data packet count value corresponding to the first identifier information.

Step 120: The MeNB generates a second check request message according to the first identifier information, and sends the second check request message to a user terminal, where the second check request message includes first indication information, the first indication information is used to instruct the user terminal to obtain second identifier information that matches the first identifier information, and a second data packet count value corresponding to the second identifier information, and the second identifier information is a DRB corresponding to the ERAB.

After receiving the first check request message, the MeNB determines that the SeNB starts detection of the bearer between the SeNB and the user terminal UE, and the MeNB obtains the first identifier information and the first data packet count value from the first check request message.

The MeNB locally stores the first data packet count value, and generates the second check request message according to the first identifier information, where the second check request message includes the first indication information, and the first indication information is used to instruct the UE to obtain the second identifier information that matches the first identifier information and is of the DRB between the UE and the SeNB, and the second data packet count value corresponding to the second identifier information.

The second data packet count value reflects a count, obtained by the UE, of sent and received data packets of the bearer between the SeNB and the UE.

It should be noted that because the first check request message may include at least two pieces of first identifier information of a bearer and at least two corresponding first data packet count values in step 110, when the UE obtains the second identifier information and the second data packet count value, the UE obtains, according to each piece of first identifier information, second identifier information corresponding to each piece of first identifier information, and a second data packet count value corresponding to the second identifier information.

Step 130: The MeNB receives a first check response message generated by the user terminal according to the second check request message, where the first check response message includes the second identifier information and the second data packet count value.

Furthermore, the UE obtains, according to the second check request message, the second identifier information that matches the first identifier information, and the second data packet count value. The UE adds the obtained second identifier information and the obtained second data packet count value to the first check response message, and sends the first check response message to the MeNB.

The MeNB receives the first check response message sent by the UE.

Step 140: The MeNB determines that no man-in-the-middle attack exists between the SeNB and the user terminal when the first data packet count value corresponding to the first identifier information is same as the second data packet count value corresponding to the second identifier information.

Furthermore, the MeNB determines by comparison whether the first data packet count value corresponding to the first identifier information is the same as the second data packet count value corresponding to the second identifier information, and the MeNB determines that no man-in-the-middle attack exists between the SeNB and the UE if the first data packet count value is the same as the second data packet count value.

According to the foregoing descriptions in step 110 and step 120, because there is at least one piece of first identifier information, at least one piece of second identifier information, at least one first data packet count value, and at least one second data packet count value, and each piece of first identifier information is corresponding to each piece of second identifier information, that the MeNB determines by comparison whether a first data packet count value corresponding to each piece of first identifier information is the same as a second data packet count value corresponding to the second identifier information that matches each piece of first identifier information.

The MeNB determines that no man-in-the-middle attack exists between the SeNB and the UE when first data packet count values corresponding to all first identifier information are same as the second data packet count value corresponding to the second identifier information that matches the first identifier information.

The MeNB sends a second check response message to the SeNB after the MeNB determines that no man-in-the-middle attack exists between the SeNB and the UE, where the second check response message includes second indication information, the second indication information is used to indicate that no man-in-the-middle attack exists between the SeNB and the UE, and the second indication information may be empty or may include a character string, or the like, such as a character string "no man-in-the-middle attack exists".

Step 150: The MeNB determines that a man-in-the-middle attack exists between the SeNB and the user terminal when the first data packet count value corresponding to the first identifier information is different from the second data packet count value corresponding to the second identifier information.

Further, the MeNB determines by comparison whether the first data packet count value is same as the second data packet count value, and the MeNB determines that a man-in-the-middle attack exists between the SeNB and the UE if the first data packet count value is different from the second data packet count value.

Further, the MeNB determines that a man-in-the-middle attack exists between the SeNB and the UE when a first data packet count value corresponding to at least one piece of first identifier information is different from the second data packet count value corresponding to the second identifier information that matches the first identifier information.

After the MeNB determines that a man-in-the-middle attack exists between the SeNB and the UE, the MeNB sends a third check response message to the SeNB, and the third check response message is used to indicate that a man-in-the-middle attack exists between the SeNB and the UE. Further, the third check response message may further include all second data packet count values that are different from the first data packet count value corresponding to the first identifier information, and first identifier information corresponding to the second data packet count values such that the SeNB determines that a man-in-the-middle attack exists between the SeNB and the user terminal, or the third check response message may include only a result of the determining, for example, includes a result that a man-in-the-middle attack exists or no man-in-the-middle attack exists.

After the MeNB sends the third check response message to the SeNB, the MeNB further sends an exception report to an MME or an O&M server such that the MME or the O&M server takes a further measure. As an example instead of a limitation, the further measure includes releasing or deleting the bearer between the SeNB and the user terminal, or counting, by the MME or the O&M server, received exception reports, and when a quantity of exception reports exceeds a quantity threshold, processing the bearer between the SeNB and the user terminal.

Optionally, the first check request message in step 110 in this embodiment of the present disclosure further includes an identifier of the SeNB.

The MeNB generates a second check request message according to the first identifier information, and sends the second check request message to a user terminal, where the second check request message includes first indication information, and the first indication information is used to enable the user terminal to obtain second identifier information that matches the first identifier information, and a second data packet count value corresponding to the second identifier information in step 120 in this embodiment of the present disclosure further includes that the MeNB generates the second check request message according to the first identifier information and the identifier of the SeNB, and sends the second check request message to the UE such that the UE obtains, according to the second check request message, the second identifier information that matches the first identifier information and the identifier of the SeNB, and the second data packet count value corresponding to the second identifier information.

Further, the second identifier information is allocated by the SeNB when the first check request message includes the identifier of the SeNB.

Further, the second identifier information is allocated by the MeNB when the first check request message does not include the identifier of the SeNB.

In this embodiment of the present disclosure, when the first check request message includes the identifier of the SeNB, the identifier of the SeNB is further carried in a subsequent check response message such that a receiver determines, according to the identifier, that the second identifier information is allocated by the SeNB.

In conclusion, according to the method for detecting a man-in-the-middle attack provided in this embodiment of the present disclosure, an SeNB initiates detection of a man-in-the-middle attack. An MeNB receives a first data packet count value that is of a bearer between the SeNB and UE and is sent by the SeNB, and requires, according to the first data packet count value sent by the SeNB, the UE to report a second data packet count value of a bearer between the UE and the SeNB, and the MeNB determines that no man-in-the-middle attack exists between the SeNB and the user terminal, and notifies the SeNB when the first data packet count value is the same as the second data packet count value. According to the technical solution of the present disclosure, in a scenario in which the SeNB offloads traffic of the MeNB, the MeNB, the SeNB, and the UE all can participate in detection of a man-in-the-middle attack.

Embodiment 2

For better understanding of the embodiments of the present disclosure, the following uses specific embodiments to provide further explanations with reference to the accompanying drawings, and the embodiments constitute no limitation to the embodiments of the present disclosure.

Figure 2:
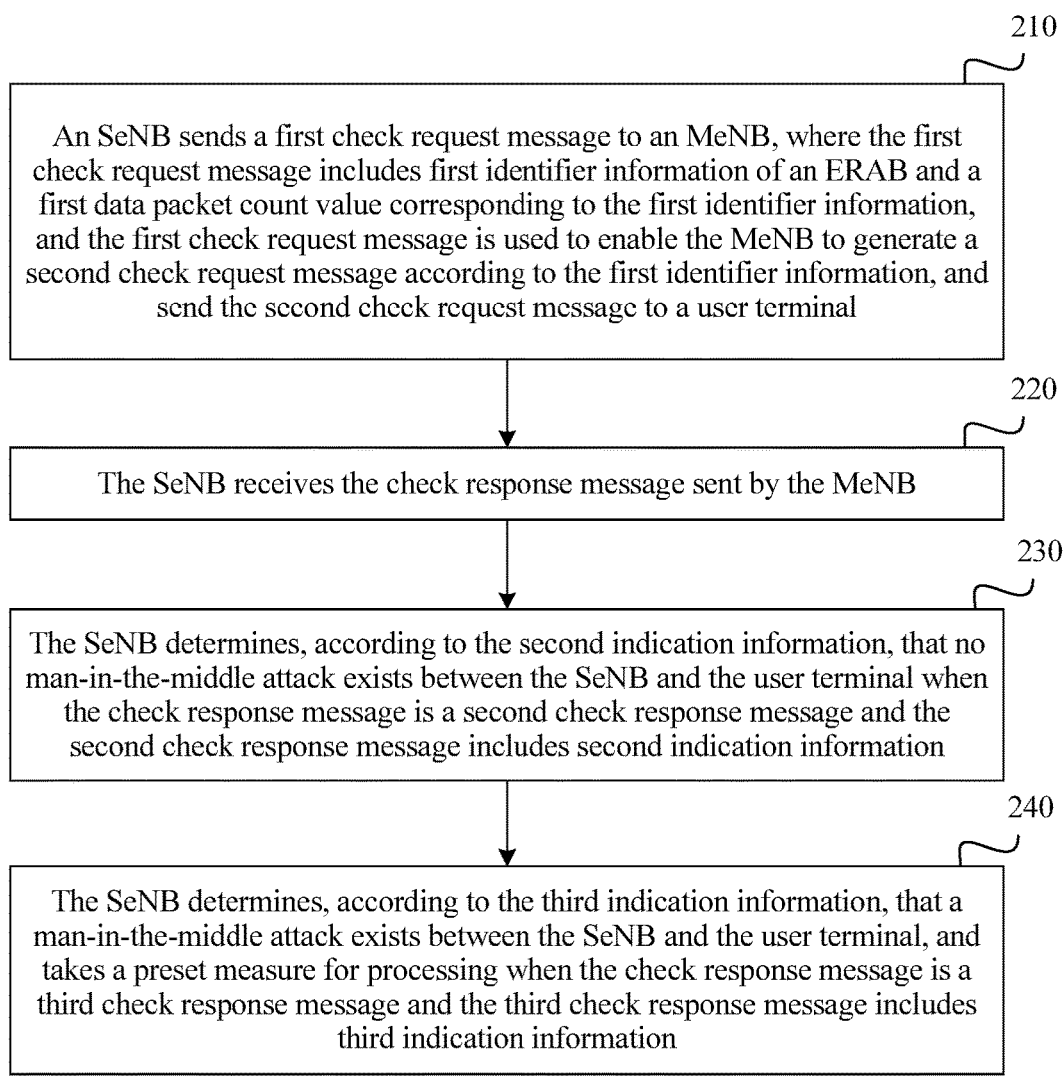
FIG. 2 is a flowchart of a method for detecting a man-in-the-middle attack according to Embodiment 2 of the present disclosure.

The following uses FIG. 2 as an example to describe in detail a method for detecting a man-in-the-middle attack provided in Embodiment 2 of the present disclosure. FIG. 2 is a flowchart of a method for detecting a man-in-the-middle attack according to Embodiment 2 of the present disclosure, and this embodiment of the present disclosure is executed by an SeNB. As shown in FIG. 2, this embodiment includes the following steps.

Step 210: An SeNB sends a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal.

The SeNB starts detection of a bearer between the SeNB and the UE, and the SeNB sends the first check request message to the MeNB, where the first check request message includes the first identifier information of the ERAB between the SeNB and the UE and the first data packet count value corresponding to the first identifier information.

The MeNB receives the first check request message, generates the second check request message according to the first identifier information, and sends the second check request message to the UE.

A process in which the MeNB determines, according to the first data packet count value and a second data packet count value reported by the UE, whether a man-in-the-middle attack exists between the SeNB and the UE is described in detail in the foregoing Embodiment 1, and is not repeated here any further.

The second data packet count value is a data packet count value corresponding to second identifier information that matches the first identifier information.

Step 220: The SeNB receives the check response message sent by the MeNB.

Step 230: The SeNB determines, according to second indication information, that no man-in-the-middle attack exists between the SeNB and the user terminal when the check response message is a second check response message and the second check response message includes the second indication information.

Furthermore, the check response message determined by the MeNB is the second check response message if the MeNB determines that no man-in-the-middle attack exists between the SeNB and the UE, and the second check response message includes the second indication information, and the SeNB determines, according to the second indication information, that no man-in-the-middle attack exists between the SeNB and the UE.

A specific implementation process of the second check response message is described in detail in the foregoing Embodiment 1, and is not repeated here any further.

Step 240: The SeNB determines, according to the third indication information, that a man-in-the-middle attack exists between the SeNB and the user terminal, and takes a preset measure for processing when the check response message is a third check response message and the third check response message includes third indication information.

Furthermore, the check response message determined by the MeNB is the third check response message if the MeNB determines that a man-in-the-middle attack exists between the SeNB and the UE, and the third check response message includes the third indication information, and the SeNB determines, according to the third indication information, that a man-in-the-middle attack exists between the SeNB and the UE.

A specific implementation process of the third check response message is described in detail in the foregoing Embodiment 1, and is not repeated here any further.

Optionally, the first check request message sent by the SeNB to the MeNB in step 210 in this embodiment of the present disclosure further includes an identifier of the SeNB.

The SeNB sends a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal in step 210 in this embodiment of the present disclosure further includes that the SeNB sends the first check request message to the MeNB, where the first check request message includes the identifier of the SeNB, the first identifier information of the ERAB, and the first data packet count value corresponding to the first identifier information, and the first check request message is used to enable the MeNB to generate the second check request message according to the first identifier information and the identifier of the SeNB, and send the second check request message to the user terminal.

Further, the second identifier information is allocated by the SeNB when the first check request message includes the identifier of the SeNB.

Further, the second identifier information is allocated by the MeNB when the first check request message does not include the identifier of the SeNB.

In this embodiment of the present disclosure, the identifier of the SeNB is further carried in a subsequent check response message such that a receiver determines, according to the identifier, that the second identifier information is allocated by the SeNB when the first check request message includes the identifier of the SeNB.

In conclusion, according to the method for detecting a man-in-the-middle attack provided in this embodiment of the present disclosure, an SeNB initiates detection of a man-in-the-middle attack, and the SeNB receives a check response message sent by an MeNB, and determines, according to the check response message, whether a man-in-the-middle attack exists between the SeNB and UE. According to the technical solution of the present disclosure, in a scenario in which the SeNB offloads traffic of the MeNB, the MeNB, the SeNB, and the UE all can participate in detection of a man-in-the-middle attack.

Embodiment 3

For better understanding of the embodiments of the present disclosure, the following uses specific embodiments to provide further explanations with reference to the accompanying drawings, and the embodiments constitute no limitation to the embodiments of the present disclosure.

Figure 3:
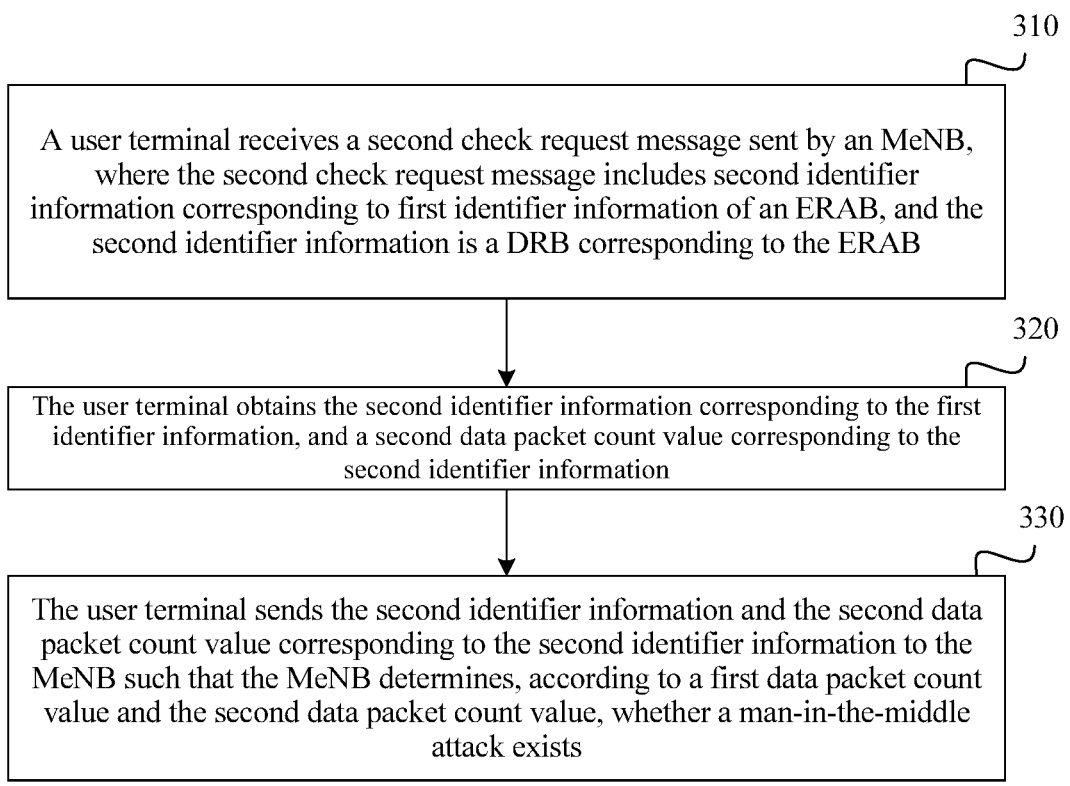
FIG. 3 is a flowchart of a method for detecting a man-in-the-middle attack according to Embodiment 3 of the present disclosure.

The following uses FIG. 3 as an example to describe in detail a method for detecting a man-in-the-middle attack provided in Embodiment 3 of the present disclosure. FIG. 3 is a flowchart of a method for detecting a man-in-the-middle attack according to Embodiment 3 of the present disclosure, and this embodiment of the present disclosure is executed by a user terminal UE. As shown in FIG. 3, this embodiment includes the following steps.

Step 310: The user terminal receives a second check request message sent by the MeNB, where the second check request message includes second identifier information corresponding to first identifier information of an ERAB, and the second identifier information is a DRB corresponding to the ERAB.

Furthermore, the SeNB starts detection of a bearer between the SeNB and the UE, the SeNB sends a first check request message to the MeNB, and the MeNB receives the first check request message, and generates the second check request message according to the first check request message, where the second check request message includes the first identifier information.

A detailed process in which the MeNB generates the second check request message and a meaning of the first identifier information are described in detail in the foregoing Embodiment 1, and are not repeated here any further.

The first identifier information is an identifier of the ERAB between the SeNB and the UE.

Step 320: The user terminal obtains the second identifier information corresponding to the first identifier information, and a second data packet count value corresponding to the second identifier information.

Further, the UE obtains the second data packet count value corresponding to the second identifier information.

The second data packet count value reflects a count, obtained by the UE, of sent and received data packets of the bearer between the SeNB and the UE.

Step 330: The user terminal sends the second identifier information and the second data packet count value corresponding to the second identifier information to the MeNB such that the MeNB determines, according to a first data packet count value and the second data packet count value, whether a man-in-the-middle attack exists.

Furthermore, the UE sends the obtained second identifier information and the obtained second data packet count value corresponding to the second identifier information to the MeNB such that the MeNB determines, according to the first data packet count value and the second data packet count value, whether a man-in-the-middle attack exists.

The first data packet count value further reflects a count, obtained by the SeNB, of sent and received data packets of the bearer between the SeNB and the UE, and the first data packet count value is corresponding to the first identifier information.

A described process in which the MeNB determines, according to the first data packet count value and the second data packet count value, whether a man-in-the-middle attack exists is described in detail in the foregoing Embodiment 1, and is not repeated here any further.

In conclusion, according to the method for detecting a man-in-the-middle attack provided in this embodiment of the present disclosure, an SeNB initiates detection of a man-in-the-middle attack, and UE obtains second identifier information and a second data packet count value according to first identifier information, and sends the second data packet count value to an MeNB such that the MeNB determines, according to a first data packet count value and the second data packet count value, whether a man-in-the-middle attack exists between the SeNB and the UE, and notifies the SeNB. Therefore, a problem in the prior art that a scenario in which the SeNB offloads traffic of the MeNB is limited to some extent is resolved, and a case in which the MeNB, the SeNB, and the UE all participate in detection of a man-in-the-middle attack is implemented.

Figure 4:
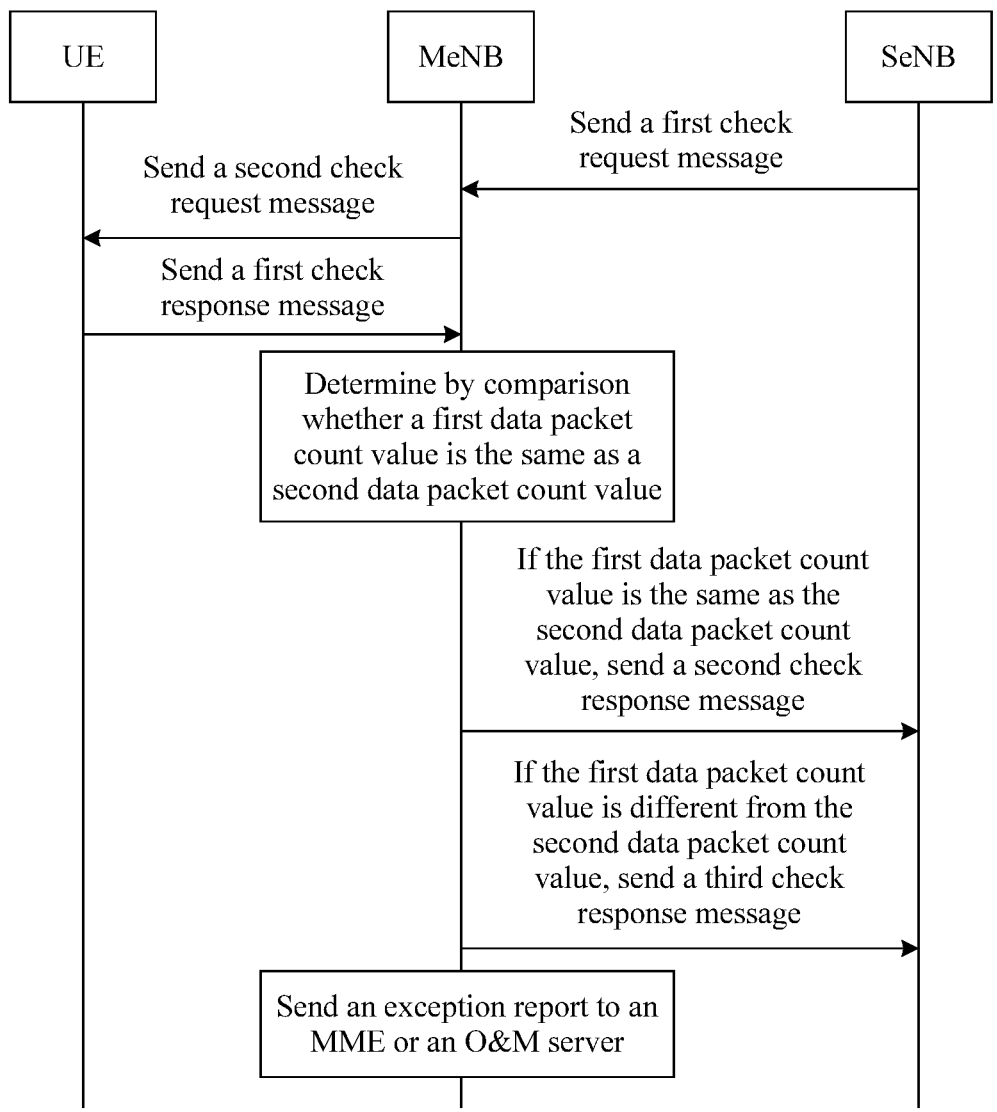
FIG. 4 is a signaling diagram of detection of a man-in-the-middle attack according to an embodiment of the present disclosure.

Further, FIG. 4 is a signaling diagram of detection of a man-in-the-middle attack according to Embodiment 1, Embodiment 2, and Embodiment 3 of the present disclosure, and the signaling diagram shown in FIG. 4 shows in detail a procedure of interaction among UE, an MeNB, and an SeNB. In FIG. 4, the MeNB identifies a first data packet count value and a second data packet count value, thereby implementing a method for detecting a man-in-the-middle attack. The method for detecting a man-in-the-middle attack in FIG. 4 may be executed according to a process described in the foregoing embodiment, and is not repeated here any further.

Embodiment 4

For better understanding of the embodiments of the present disclosure, the following uses specific embodiments to provide further explanations with reference to the accompanying drawings, and the embodiments constitute no limitation to the embodiments of the present disclosure.

Figure 5:
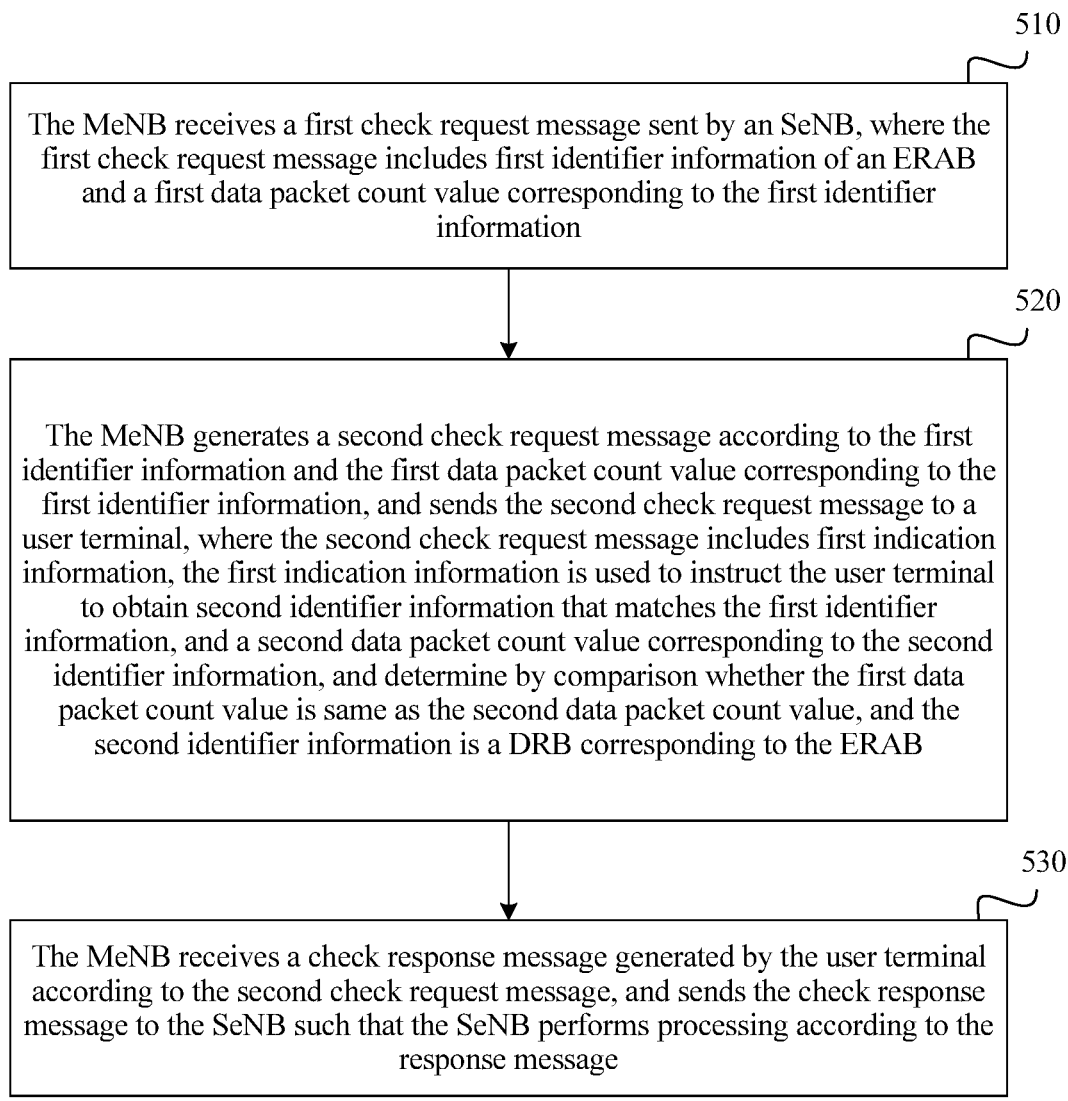
FIG. 5 is a flowchart of a method for detecting a man-in-the-middle attack according to Embodiment 4 of the present disclosure.

The following uses FIG. 5 as an example to describe in detail a method for detecting a man-in-the-middle attack provided in Embodiment 4 of the present disclosure. FIG. 5 is a flowchart of a method for detecting a man-in-the-middle attack according to Embodiment 4 of the present disclosure, and this embodiment of the present disclosure is executed by an MeNB. As shown in FIG. 5, this embodiment includes the following steps.

Step 510: The MeNB receives a first check request message sent by an SeNB, where the first check request message includes first identifier information of an ERAB and a first data packet count value corresponding to the first identifier information.

Further, the SeNB starts detection of a bearer between the SeNB and UE, and the SeNB sends the first check request message to the MeNB, where the first check request message includes the first identifier information of the ERAB between the SeNB and the UE and the first data packet count value corresponding to the first identifier information.

The first data packet count value reflects a count, obtained by the SeNB, of sent and received data packets of the bearer between the SeNB and the UE.

It may be understood that there are multiple bearers between the SeNB and the UE, and each bearer has one piece of first identifier information. In this embodiment of the present disclosure, the first check request message includes at least two pieces of first identifier information corresponding to a bearer, and at least two first data packet count values corresponding to the first identifier information.

The MeNB receives the first check request message.

Step 520: The MeNB generates a second check request message according to the first identifier information and the first data packet count value corresponding to the first identifier information, and sends the second check request message to a user terminal, where the second check request message includes first indication information, the first indication information is used to instruct the user terminal to obtain second identifier information that matches the first identifier information, and a second data packet count value corresponding to the second identifier information, and determine by comparison whether the first data packet count value is the same as the second data packet count value, and the second identifier information is a DRB corresponding to the ERAB.

Furthermore, after receiving the first check request message, the MeNB determines that the SeNB starts detection of the bearer between the SeNB and the UE, and the MeNB obtains the first identifier information and the first data packet count value from the first check request message.

The MeNB generates the second check request message according to the first identifier information and the first data packet count value, and sends the second check request message to the UE, where the second check request message includes the first indication information, and the first indication information is used to instruct the UE to obtain the second identifier information that matches the first identifier information, and the second data packet count value corresponding to the second identifier information, and determine by comparison whether the first data packet count value is the same as the second data packet count value.

Further, in this embodiment of the present disclosure, the UE may obtain, according to the first indication information, the second identifier information that matches the first identifier information and is of the DRB between the UE and the SeNB, and the second data packet count value corresponding to the second identifier information.

The second data packet count value reflects a count, obtained by the UE, of sent and received data packets of the bearer between the SeNB and the UE.

It should be noted that because the first check request message may include at least two pieces of first identifier information of a bearer and at least two corresponding first data packet count values in step 510, when the UE obtains the second identifier information and the second data packet count value, the UE obtains, according to each piece of first identifier information, second identifier information corresponding to each piece of first identifier information, and a second data packet count value corresponding to the second identifier.

Step 530: The MeNB receives a check response message generated by the user terminal according to the second check request message, and sends the check response message to the SeNB such that the SeNB performs processing according to the check response message.

Furthermore, the UE determines by comparison whether the first data packet count value is the same as the second data packet count value, and generates the check response message according to a result of the comparing, and the UE sends the check response message to the MeNB.

According to the foregoing descriptions in step 510 and step 520, because there are at least two pieces of first identifier information, at least two pieces of second identifier information, at least two first data packet count values, and at least two second data packet count values, and each piece of first identifier information is corresponding to each piece of second identifier information, that the UE determines by comparison whether the first data packet count value is the same as the second data packet count value by comparison whether a first data packet count value corresponding to each piece of first identifier information is the same as a second data packet count value corresponding to the second identifier information that matches each piece of first identifier information.

The UE determines that no man-in-the-middle attack exists between the SeNB and the UE when first data packet count values corresponding to all first identifier information are the same as the second data packet count value corresponding to the second identifier information that matches the first identifier information.

The UE determines that a man-in-the-middle attack exists between the SeNB and the UE when first data packet count values corresponding to at least two pieces of first identifier information are different from the second data packet count value corresponding to the second identifier information that matches the first identifier information.

The MeNB receives the check response message sent by the UE according to a result of the comparing and a result of the determining, and sends the check response message to the SeNB such that the SeNB performs processing according to the response message.

In an embodiment of the present disclosure, the UE identifies whether the first data packet count value corresponding to the first identifier information is the same as the second data packet count value corresponding to the second identifier information, and the UE determines that no man-in-the-middle attack exists between the SeNB and the UE if the first data packet count value is the same as the second data packet count value, and generates a first check response message. The MeNB receives the first check response message sent by the UE, and sends the first check response message to the SeNB such that the SeNB performs processing according to the first check response message, where the first check response message includes a first indication information, and the first indication information may be empty or may be a character string, such as a character string identifier "no" or "no man-in-the-middle attack exists".

In another embodiment of the present disclosure, the UE identifies whether the first data packet count value corresponding to the first identifier information is the same as the second data packet count value corresponding to the second identifier information, and the UE determines that a man-in-the-middle attack exists between the SeNB and the UE if the first data packet count value is different from the second data packet count value, and generates a second check response message. The MeNB receives the second check response message sent by the UE, and sends the second check response message to the SeNB such that the SeNB performs processing according to the second check response message. The second check response message includes second indication information, and the second indication information may further include all second data packet count values that are different from the first data packet count value corresponding to the first identifier information, and first identifier information corresponding to the second data packet count values such that the SeNB determines that a man-in-the-middle attack exists between the SeNB and the user terminal, or the third check response message may include only a result of the determining, for example, include a result that a man-in-the-middle attack exists or no man-in-the-middle attack exists.

In this embodiment of the present disclosure, the SeNB determines, according to the check response message, whether a man-in-the-middle attack exists between the SeNB and the UE. The SeNB sends an exception report to the MeNB when the SeNB determines, according to the check response message, that a man-in-the-middle attack exists between the SeNB and the UE.

Optionally, the first check request message sent in step 510 in this embodiment of the present disclosure further includes an identifier of the SeNB.

That the MeNB generates a second check request message according to the first identifier information and the first data packet count value corresponding to the first identifier information, and sends the second check request message to a user terminal, where the second check request message includes first indication information, and the first indication information is used to instruct the user terminal to obtain second identifier information that matches the first identifier information, and a second data packet count value corresponding to the second identifier information, and determine by comparison whether the first data packet count value is the same as the second data packet count value in step 520 in this embodiment of the present disclosure further includes that the MeNB generates the second check request message according to the identifier of the SeNB, the first identifier information, and the first data packet count value corresponding to the first identifier information, and sends the second check request message to the UE, where the second check request message includes the first indication information, and the first indication information is used to instruct the UE to obtain the second identifier information that matches the first identifier information, and the second data packet count value corresponding to the second identifier information, and determine by comparison whether the first data packet count value is the same as the second data packet count value.

Further, the second identifier information is allocated by the SeNB when the first check request message includes the identifier of the SeNB.

Further, the second identifier information is allocated by the MeNB when the first check request message does not include the identifier of the SeNB.

In this embodiment of the present disclosure, when the first check request message includes the identifier of the SeNB, the identifier of the SeNB is further carried in a subsequent check response message such that a receiver determines, according to the identifier, that the second identifier information is allocated by the SeNB.

Optionally, after step 530 in this embodiment of the present disclosure, the method further includes a step in which the MeNB sends the exception report to an MME or an O&M server.

Further, the MeNB sends the exception report to the MME or the O&M server when the MeNB receives the exception report sent by the SeNB.

In conclusion, according to the method for detecting a man-in-the-middle attack provided in this embodiment of the present disclosure, an SeNB initiates detection of a man-in-the-middle attack, an MeNB sends a second check request message to UE according to a first check request message sent by the SeNB, and the MeNB receives a check response message sent by the UE, and forwards the check response message to the SeNB when the UE determines, according to the second check request message, that a man-in-the-middle attack exists between the SeNB and the UE. According to the technical solution provided in the present disclosure, in a scenario in which the SeNB offloads traffic of the MeNB, the MeNB, the SeNB, and the UE all can participate in detection of a man-in-the-middle attack.

Embodiment 5

For better understanding of the embodiments of the present disclosure, the following uses specific embodiments to provide further explanations with reference to the accompanying drawings, and the embodiments constitute no limitation to the embodiments of the present disclosure.

Figure 6:
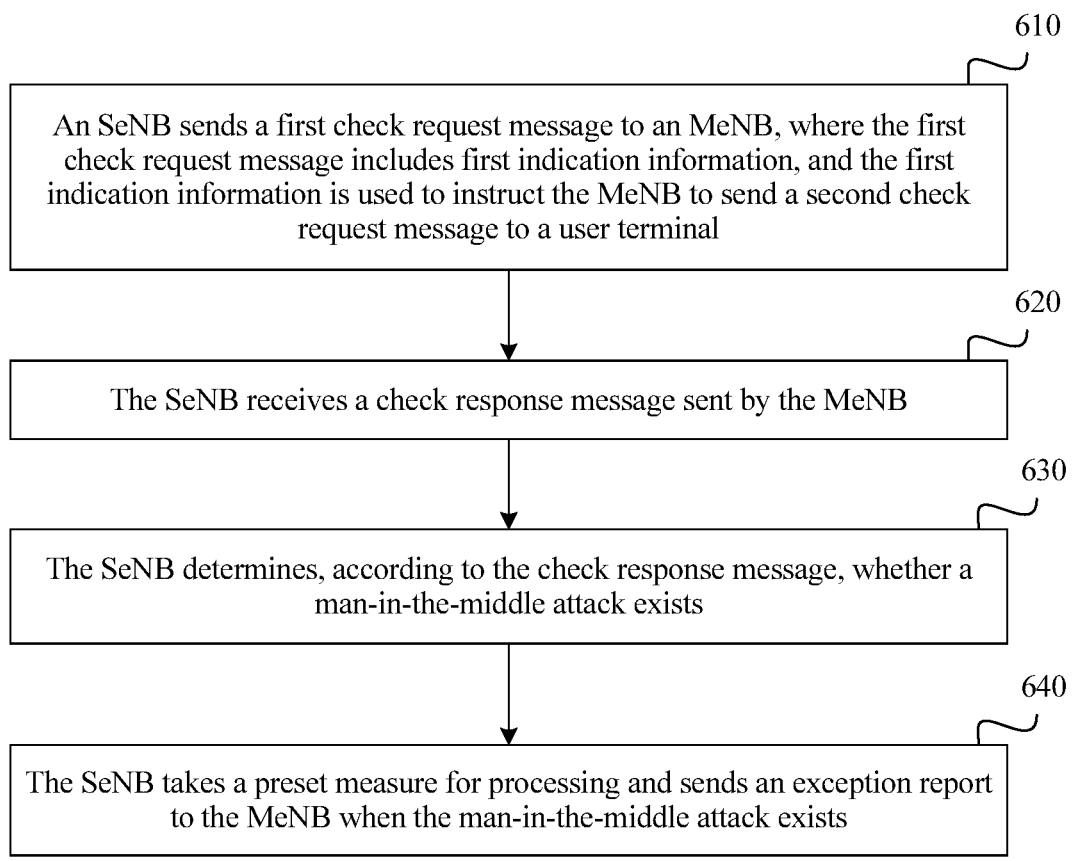
FIG. 6 is a flowchart of a method for detecting a man-in-the-middle attack according to Embodiment 5 of the present disclosure.

The following uses FIG. 6 as an example to describe in detail a method for detecting a man-in-the-middle attack provided in Embodiment 5 of the present disclosure. FIG. 6 is a flowchart of a method for detecting a man-in-the-middle attack according to Embodiment 5 of the present disclosure, and this embodiment of the present disclosure is executed by an SeNB. As shown in FIG. 6, this embodiment includes the following steps.

Step 610: An SeNB sends a first check request message to an MeNB, where the first check request message includes first indication information, and the first indication information is used to instruct the MeNB to send a second check request message to a user terminal.

Further, the SeNB starts detection of a bearer between the SeNB and the UE, and the SeNB sends the first check request message to the MeNB, where the first check request message includes the first indication information, and the first indication information is used to instruct the MeNB to send the second check request message to the UE.

Content carried by the first check request message and a detailed process in which the MeNB sends the second check request message to the UE according to the first indication information are described in detail in the foregoing Embodiment 4, and are not repeated here any further.

Step 620: The SeNB receives a check response message sent by the MeNB.

Further, the MeNB sends the second check request message to the UE such that the UE determines, according to the second check request message, whether a man-in-the-middle attack exists between the SeNB and the UE, and sends the check response message to the MeNB according to a result of the determining. The MeNB sends the check response message to the SeNB.

Step 630: The SeNB determines, according to the check response message, whether a man-in-the-middle attack exists.

Further, the SeNB receives the check response message, and determines, according to the check response message, whether a man-in-the-middle attack exists.

Further, when the check response message carries a data packet count value fed back by the UE, the SeNB determines that a man-in-the-middle attack exists between the SeNB and the UE.

Step 640 The SeNB takes a preset measure for processing and sends an exception report to the MeNB when the man-in-the-middle attack exists.

Further, the SeNB takes the preset measure for processing and sends the exception report to the MeNB such that the MeNB sends the exception report to an MME or an O&M server when the SeNB determines that a man-in-the-middle attack exists.

In conclusion, according to the method for detecting a man-in-the-middle attack provided in this embodiment of the present disclosure, an SeNB initiates detection of a man-in-the-middle attack, and the SeNB receives a check response message sent by an MeNB, and determines whether a man-in-the-middle attack exists between the SeNB and the UE when UE determines that a man-in-the-middle attack exists between the SeNB and the UE. According to the technical solution provided in the present disclosure, in a scenario in which the SeNB offloads traffic of the MeNB, the MeNB, the SeNB, and the UE all can participate in detection of a man-in-the-middle attack.

Embodiment 6

For better understanding of the embodiments of the present disclosure, the following uses specific embodiments to provide further explanations with reference to the accompanying drawings, and the embodiments constitute no limitation to the embodiments of the present disclosure.

Figure 7:
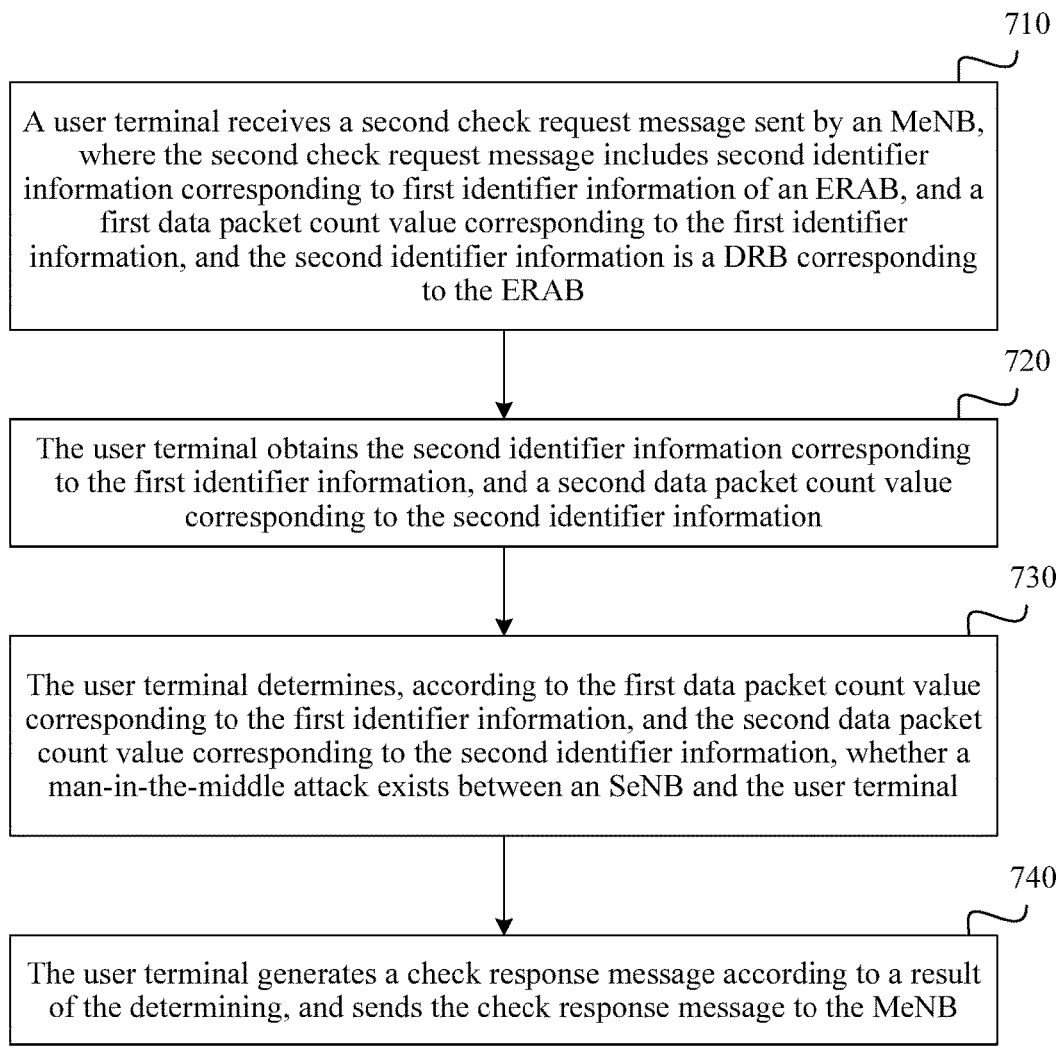
FIG. 7 is a flowchart of a method for detecting a man-in-the-middle attack according to Embodiment 6 of the present disclosure.

The following uses FIG. 7 as an example to describe in detail a method for detecting a man-in-the-middle attack provided in Embodiment 6 of the present disclosure. FIG. 7 is a flowchart of a method for detecting a man-in-the-middle attack according to Embodiment 6 of the present disclosure, and this embodiment of the present disclosure is executed by a user terminal UE. As shown in FIG. 7, this embodiment includes the following steps.

Step 710: The user terminal receives a second check request message sent by an MeNB, where the second check request message includes second identifier information corresponding to first identifier information of an ERAB, and a first data packet count value corresponding to the first identifier information, and the second identifier information is a DRB corresponding to the ERAB.

Further, the UE receives the second check request message sent by the MeNB, where the second check request message includes the first identifier information of the ERAB between an SeNB and the UE and the first data packet count value corresponding to the first identifier information.

The first data packet count value further reflects a count, obtained by the SeNB, of sent and received data packets of the bearer between the SeNB and the UE.

A detailed process in which the MeNB generates the second check request message according to a first check request message sent by the SeNB and sends the second check request message to the UE, and content carried in the first check request message are described in detail in the foregoing Embodiment 4, and are not repeated here any further.

Step 720: The user terminal obtains the second identifier information corresponding to the first identifier information, and a second data packet count value corresponding to the second identifier information.

Further, the UE obtains, according to the first identifier information included in the second check request message, the second identifier information corresponding to the first identifier information, and the second data packet count value corresponding to the second identifier information.

Further, in this embodiment of the present disclosure, the UE obtains the second identifier information and the second data packet count value corresponding to the second identifier information.

The second data packet count value reflects a count, obtained by the UE, of sent and received data packets of the bearer between the SeNB and the UE.

It should be noted that because the first check request message may include at least two pieces of first identifier information of a bearer and at least two corresponding first data packet count values in step 710, when the UE obtains the second identifier information and the second data packet count value, the UE obtains, according to each piece of first identifier information, second identifier information corresponding to each piece of first identifier information, and a second data packet count value corresponding to the second identifier.

Step 730: The user terminal determines, according to the first data packet count value corresponding to the first identifier information, and the second data packet count value corresponding to the second identifier information, whether a man-in-the-middle attack exists between an SeNB and the user terminal.

Further, the UE determines by comparison whether the first data packet count value is the same as the second data packet count value, and the UE determines that no man-in-the-middle attack exists between the SeNB and the UE when the first data packet count value corresponding to the first identifier information is the same as the second data packet count value corresponding to the second identifier information.

The UE determines that a man-in-the-middle attack exists between the SeNB and the UE when the first data packet count value corresponding to the first identifier information is different from the second data packet count value corresponding to the second identifier information.

Further, according to the foregoing description in step 720, because there are at least two pieces of first identifier information, at least two pieces of second identifier information, at least two first data packet count values, and at least two second data packet count values, and each piece of first identifier information is corresponding to each piece of second identifier information, that the UE determines by comparison whether the first data packet count value is same as the second data packet count value by comparison whether a first data packet count value corresponding to each piece of first identifier information is same as a second data packet count value corresponding to the second identifier information that matches each piece of first identifier information.

The UE determines that no man-in-the-middle attack exists between the SeNB and the UE when first data packet count values corresponding to all first identifier information are same as the second data packet count value corresponding to the second identifier information that matches the first identifier information.

The UE determines that a man-in-the-middle attack exists between the SeNB and the UE when first data packet count values corresponding to at least two pieces of first identifier information are different from the second data packet count value corresponding to the second identifier information that matches the first identifier information.

Step 740: The user terminal generates a check response message according to a result of the determining, and sends the check response message to the MeNB.

Further, the UE generates the check response message according to the result of the determining in step 730, and sends the check response message to the MeNB.

Further, in an implementation manner, the UE identifies whether the first data packet count value corresponding to the first identifier information is same as the second data packet count value corresponding to the second identifier information, and the UE determines that no man-in-the-middle attack exists between the SeNB and the UE, and generates a first check response message if the first data packet count value is same as the second data packet count value. The MeNB receives the first check response message sent by the UE, and sends the first check response message to the SeNB such that the SeNB performs processing according to the first check response message.

In another implementation manner, the UE identifies whether the first data packet count value corresponding to the first identifier information is the same as the second data packet count value corresponding to the second identifier information, and the UE determines that a man-in-the-middle attack exists between the SeNB and the UE, and generates a second check response message if the first data packet count value is different from the second data packet count value. The MeNB receives the second check response message sent by the UE, and sends the second check response message to the SeNB such that the SeNB performs processing according to the second check response message.

In conclusion, according to the method for detecting a man-in-the-middle attack provided in this embodiment of the present disclosure, an SeNB initiates detection of a man-in-the-middle attack, UE determines, according to a second check request message sent by an MeNB, whether a man-in-the-middle attack exists between the SeNB and the UE, and the UE sends a check response message to the MeNB when the UE determines that a man-in-the-middle attack exists between the SeNB and the UE. According to the technical solution provided in the present disclosure, in a scenario in which the SeNB offloads traffic of the MeNB, the MeNB, the SeNB, and the UE all can participate in detection of a man-in-the-middle attack.

Figure 8:
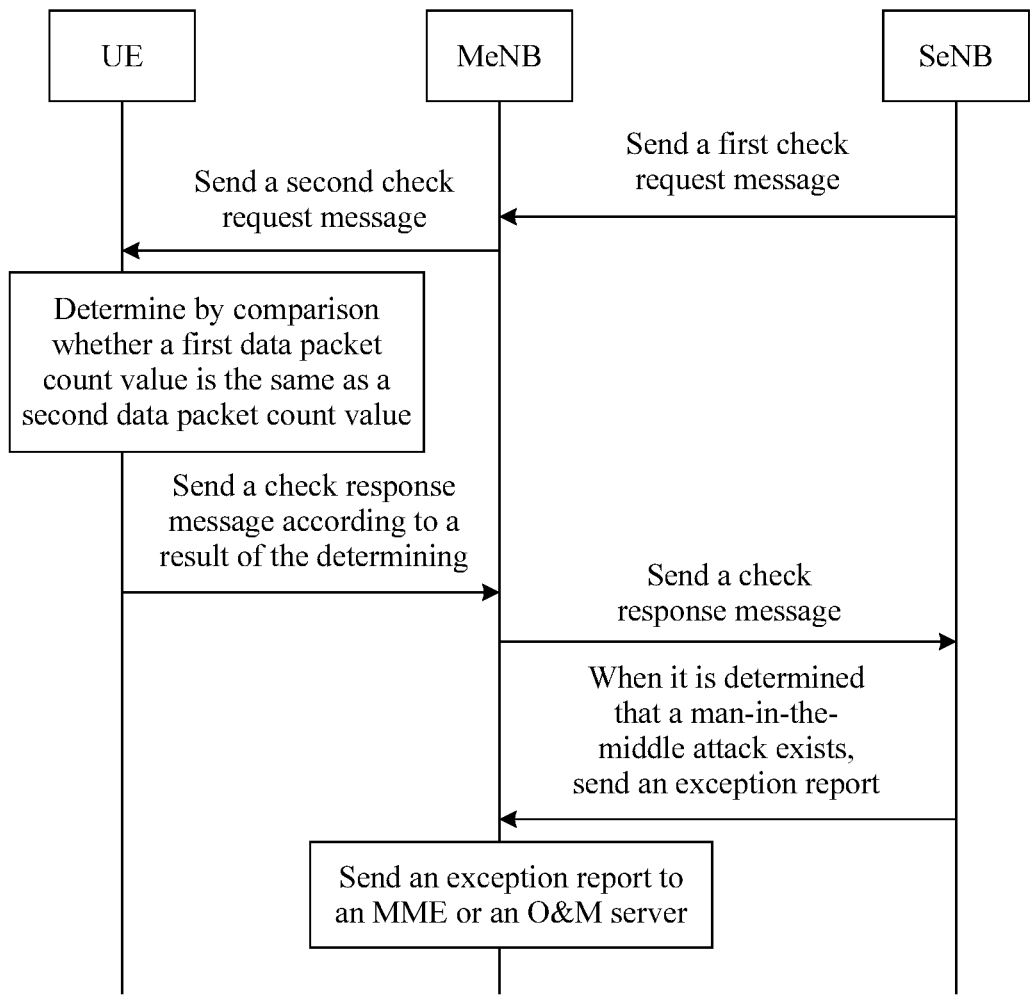
FIG. 8 is a signaling diagram of detection of a man-in-the-middle attack according to an embodiment of the present disclosure.

Further, FIG. 8 is a signaling diagram of detection of a man-in-the-middle attack according to Embodiment 4, Embodiment 5, and Embodiment 6 of the present disclosure, and the signaling diagram shown in FIG. 8 shows in detail a procedure of interaction among UE, an MeNB, and an SeNB. In FIG. 8, the UE compares a first data packet count value with a second data packet count value, thereby implementing a method for detecting a man-in-the-middle attack. The method for detecting a man-in-the-middle attack in FIG. 8 may be executed according to a process described in the foregoing embodiment, and is not repeated here any further.

Embodiment 7

For better understanding of the embodiments of the present disclosure, the following uses specific embodiments to provide further explanations with reference to the accompanying drawings, and the embodiments constitute no limitation to the embodiments of the present disclosure.

Figure 9:
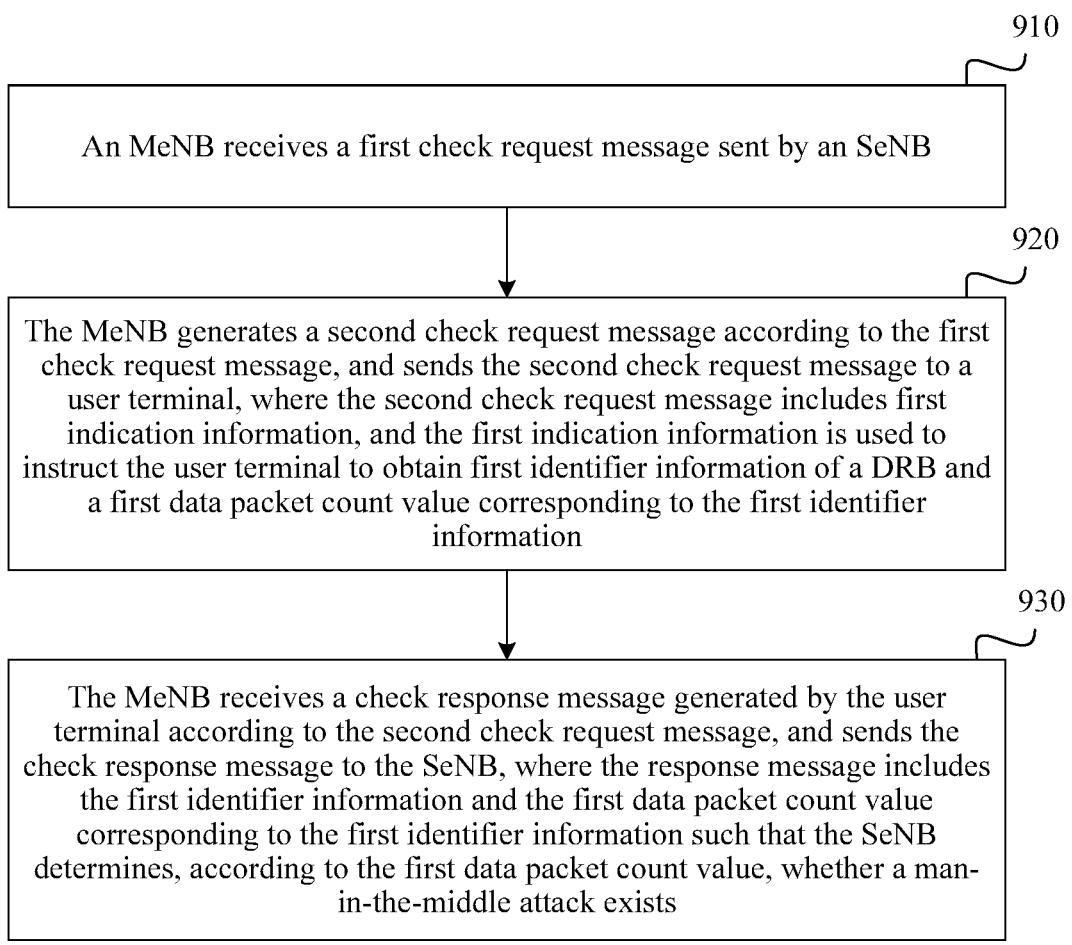
FIG. 9 is a flowchart of a method for detecting a man-in-the-middle attack according to Embodiment 7 of the present disclosure.

The following uses FIG. 9 as an example to describe in detail a method for detecting a man-in-the-middle attack provided in Embodiment 7 of the present disclosure. FIG. 9 is a flowchart of a method for detecting a man-in-the-middle attack according to Embodiment 7 of the present disclosure, and this embodiment of the present disclosure is executed by an MeNB. As shown in FIG. 9, this embodiment includes the following steps.

Step 910: An MeNB receives a first check request message sent by an SeNB.

Further, the SeNB starts detection of a bearer between the SeNB and UE, and the SeNB sends the first check request message to the MeNB, where the first check request message is used to enable the MeNB to send a second check request message to the user terminal.

Step 920: The MeNB generates a second check request message according to the first check request message, and sends the second check request message to a user terminal, where the second check request message includes first indication information, and the first indication information is used to instruct the user terminal to obtain first identifier information of a DRB and a first data packet count value corresponding to the first identifier information.

Further, after receiving the first check request message, the MeNB determines that the SeNB starts detection of the bearer between the SeNB and the UE, and the MeNB determines, according to the first check request message, that the SeNB expects to receive a data packet count value that is of the bearer between the SeNB and the UE and is reported by the UE, and the MeNB generates the second check request message and sends the second check request message to the UE.

Further, the second check request message includes the first indication information, and in this embodiment of the present disclosure, the UE may obtain, according to the first indication information, the first identifier information of the DRB between the UE and the SeNB and the first data packet count value corresponding to the first identifier information.

The first data packet count value reflects a count, obtained by the UE, of sent and received data packets of the bearer between the SeNB and the UE.

It may be understood that there are multiple bearers between the SeNB and the UE, and each bearer has a specified service. In this embodiment of the present disclosure, the SeNB may send one first check request message to the MeNB such that the UE reports at least two first data packet count values corresponding to all bearers between the UE and the SeNB.

Step 930: The MeNB receives a check response message generated by the user terminal according to the second check request message, and sends the check response message to the SeNB, where the response message includes the first identifier information and the first data packet count value corresponding to the first identifier information such that the SeNB determines, according to the first data packet count value, whether a man-in-the-middle attack exists.

Further, the UE obtains the first identifier information and the first data packet count value according to the second check request message. The UE adds the obtained first identifier information and the obtained first data packet count value to the check response message, and sends the check response message to the MeNB.

The MeNB receives a first check response message sent by the UE.

The check response message includes the first identifier information and the first data packet count value corresponding to the first identifier information such that the SeNB determines, according to the first data packet count value, whether a man-in-the-middle attack exists.

Optionally, the first check request message received by the MeNB in step 910 in this embodiment of the present disclosure further includes an identifier of the SeNB.

That the MeNB generates a second check request message according to the first check request message, and sends the second check request message to a user terminal, where the second check request message includes first indication information, and the first indication information is used to instruct the user terminal to obtain first identifier information of a DRB and a first data packet count value corresponding to the first identifier information in step 920 in this embodiment of the present disclosure further includes that the MeNB generates the second check request message according to the identifier of the SeNB and the first check request message, and sends the second check request message to the UE, where the second check request message includes the first indication information, and the first indication information is used to instruct the UE to obtain the first identifier information and the first data packet count value corresponding to the first identifier information.

Further, the first identifier information is allocated by the SeNB when the first check request message includes the identifier of the SeNB.

Further, the first identifier information is allocated by the MeNB when the first check request message does not include the identifier of the SeNB.

In this embodiment of the present disclosure, the identifier of the SeNB is further carried in a subsequent check response message such that a receiver determines, according to the identifier, that the first identifier information is allocated by the SeNB when the first check request message includes the identifier of the SeNB.

Optionally, after step 930 in this embodiment of the present disclosure, the method further includes a step in which the MeNB sends an exception report to an MME or an O&M server.

Further, the MeNB sends the exception report to the MME or the O&M server when the MeNB receives the exception report sent by the SeNB.

The exception report sent by the SeNB is further generated after the SeNB determines, according to the first data packet count value and a second data packet count value that is stored and obtained by the SeNB, whether a man-in-the-middle attack exists.

In conclusion, according to the method for detecting a man-in-the-middle attack provided in this embodiment of the present disclosure, an SeNB initiates detection of a man-in-the-middle attack, and an MeNB sends a second check request message to UE according to a first check request message sent by the SeNB, and forwards, to the SeNB, a check response message fed back by the UE such that the SeNB determines whether a man-in-the-middle attack exists between the SeNB and the UE, and notifies the MeNB. According to the technical solution provided in the present disclosure, in a scenario in which the SeNB offloads traffic of the MeNB, the MeNB, the SeNB, and the UE all can participate in detection of a man-in-the-middle attack.

Embodiment 8

For better understanding of the embodiments of the present disclosure, the following uses specific embodiments to provide further explanations with reference to the accompanying drawings, and the embodiments constitute no limitation to the embodiments of the present disclosure.

Figure 10:
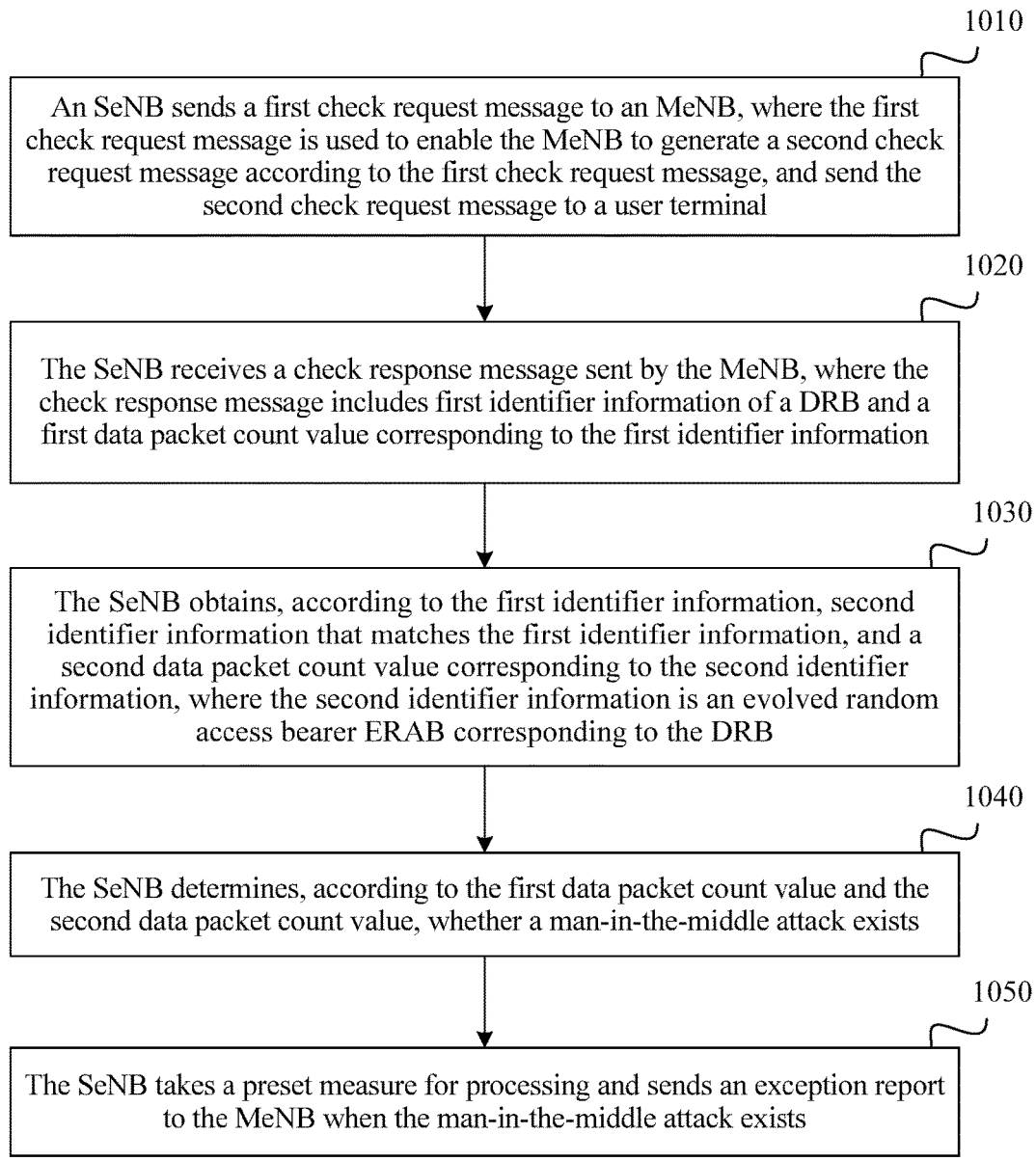
FIG. 10 is a flowchart of a method for detecting a man-in-the-middle attack according to Embodiment 8 of the present disclosure.

The following uses FIG. 10 as an example to describe in detail a method for detecting a man-in-the-middle attack provided in Embodiment 7 of the present disclosure. FIG. 10 is a flowchart of a method for detecting a man-in-the-middle attack according to Embodiment 7 of the present disclosure, and this embodiment of the present disclosure is executed by an SeNB. As shown in FIG. 10, this embodiment includes the following steps.

Step 1010: An SeNB sends a first check request message to an MeNB, where the first check request message is used to enable the MeNB to generate a second check request message according to the first check request message, and send the second check request message to a user terminal.

Further, the SeNB starts detection of a bearer between the SeNB and UE, and the SeNB sends the first check request message to the MeNB, where the first check request message is used to enable the MeNB to generate the second check request message and send the second check request message to the UE.

A detailed process in which the MeNB generates the second check request message and sends the second check request message to the UE is described in detail in the foregoing Embodiment 8, and is not repeated here any further.

Step 1020: The SeNB receives a check response message sent by the MeNB, where the check response message includes first identifier information of a DRB and a first data packet count value corresponding to the first identifier information.

Further, the UE obtains, according to the second check request message, the first identifier information of the DRB between the UE and the SeNB and the first data packet count value corresponding to the first identifier information, adds the first identifier information and the first data packet count value to the check response message, and sends the check response message to the MeNB.

The MeNB sends the check response message to the SeNB.

The first data packet count value further reflects a count, obtained by the SeNB, of sent and received data packets of the bearer between the SeNB and the UE.

It may be understood that there are multiple bearers between the SeNB and the UE, and each bearer has one piece of first identifier information. In this embodiment of the present disclosure, the first check request message may include at least two pieces of first identifier information corresponding to a bearer, and at least two first data packet count values.

Step 1030: The SeNB obtains, according to the first identifier information, second identifier information that matches the first identifier information, and a second data packet count value corresponding to the second identifier information, where the second identifier information is an ERAB corresponding to the DRB.

Further, after receiving the check response message, the SeNB obtains the first identifier information and the first data packet count value from the check response message. The SeNB obtains, according to the first identifier information, the second identifier information that is corresponding to the first identifier information and is of the ERAB between the SeNB and the UE and the second data packet count value corresponding to the second identifier information.

The second data packet count value further reflects a count, obtained by the SeNB, of sent and received data packets of the bearer between the SeNB and the UE.

It should be noted that because the check response message includes at least two pieces of first identifier information in step 1020, the SeNB obtains, according to each piece of first identifier information, second identifier information that matches each piece of first identifier information, and a second data packet count value corresponding to the second identifier information when the SeNB obtains the second identifier information that matches the first identifier information, and the second data packet count value.

Step 1040: The SeNB determines, according to the first data packet count value and the second data packet count value, whether a man-in-the-middle attack exists.

Further, the SeNB identifies whether the first data packet count value is the same as the second data packet count value, and the SeNB determines that no man-in-the-middle attack exists between the SeNB and the UE if the first data packet count value is the same as the second data packet count value, or the SeNB determines that a man-in-the-middle attack exists between the SeNB and the UE if the first data packet count value is different from the second data packet count value.

According to the foregoing descriptions in step 1020 and step 1030, because there are at least two pieces of first identifier information, at least two pieces of second identifier information, at least two first data packet count values, and at least two second data packet count values, and each piece of first identifier information is corresponding to each piece of second identifier information, that the SeNB determines whether the first data packet count value is the same as the second data packet count value includes that the SeNB identifies whether a first data packet count value corresponding to each piece of second identifier information is the same as a second data packet count value corresponding to the first identifier information that matches each piece of second identifier information.

The SeNB determines that no man-in-the-middle attack exists between the SeNB and the UE when the first data packet count value corresponding to the first identifier information is the same as the second data packet count value corresponding to the second identifier information.

That is, the SeNB determines that no man-in-the-middle attack exists between the SeNB and the UE when first data packet count values corresponding to all first identifier information are the same as the second data packet count value corresponding to the second identifier information that matches the first identifier information.

The SeNB determines that a man-in-the-middle attack exists between the SeNB and the UE when the first data packet count value corresponding to the first identifier information is different from the second data packet count value corresponding to the second identifier information.

That is, the SeNB determines that a man-in-the-middle attack exists between the SeNB and the UE when a first data packet count value corresponding to at least one piece of first identifier information is different from the second data packet count value corresponding to the second identifier information that matches the first identifier information.

Step 1050: The SeNB take a preset measure for processing and sends an exception report to the MeNB.

Further, after the SeNB determines that a man-in-the-middle attack exists between the SeNB and the UE, the SeNB takes the preset measure for processing and sends the exception report to the MeNB such that the MeNB sends the exception report to an MME or an O&M server, and the MME or the O&M server takes a further measure. As an example instead of a limitation, the further measure includes releasing or deleting the bearer between the SeNB and the user terminal, or counting, by the MME or the O&M server, received exception reports, and processing the bearer between the SeNB and the user terminal when a quantity of exception reports exceeds a quantity threshold.

Optionally, the first check request message in step 1010 in this embodiment of the present disclosure further includes an identifier of the SeNB, and the second check request message further includes the identifier of the SeNB.

Further, the first identifier information is allocated by the SeNB when the first check request message includes the identifier of the SeNB.

Further, the first identifier information is allocated by the MeNB when the first check request message does not include the identifier of the SeNB.

In this embodiment of the present disclosure, the identifier of the SeNB is further carried in a subsequent check response message such that a receiver determines, according to the identifier, that the second identifier information is allocated by the SeNB when the first check request message includes the identifier of the SeNB.

In conclusion, according to the method for detecting a man-in-the-middle attack provided in this embodiment of the present disclosure, an SeNB initiates detection of a man-in-the-middle attack, and requires UE to report a first data packet count value of a bearer between the UE and the SeNB, and the SeNB determines, according to the first data packet count value and an obtained second data packet count value stored by the SeNB, whether a man-in-the-middle attack exists between the SeNB and the UE, and notifies an MeNB. According to the technical solution provided in the present disclosure, in a scenario in which the SeNB offloads traffic of the MeNB, the MeNB, the SeNB, and the UE all can participate in detection of a man-in-the-middle attack.

Embodiment 9

For better understanding of the embodiments of the present disclosure, the following uses specific embodiments to provide further explanations with reference to the accompanying drawings, and the embodiments constitute no limitation to the embodiments of the present disclosure.

Figure 11:
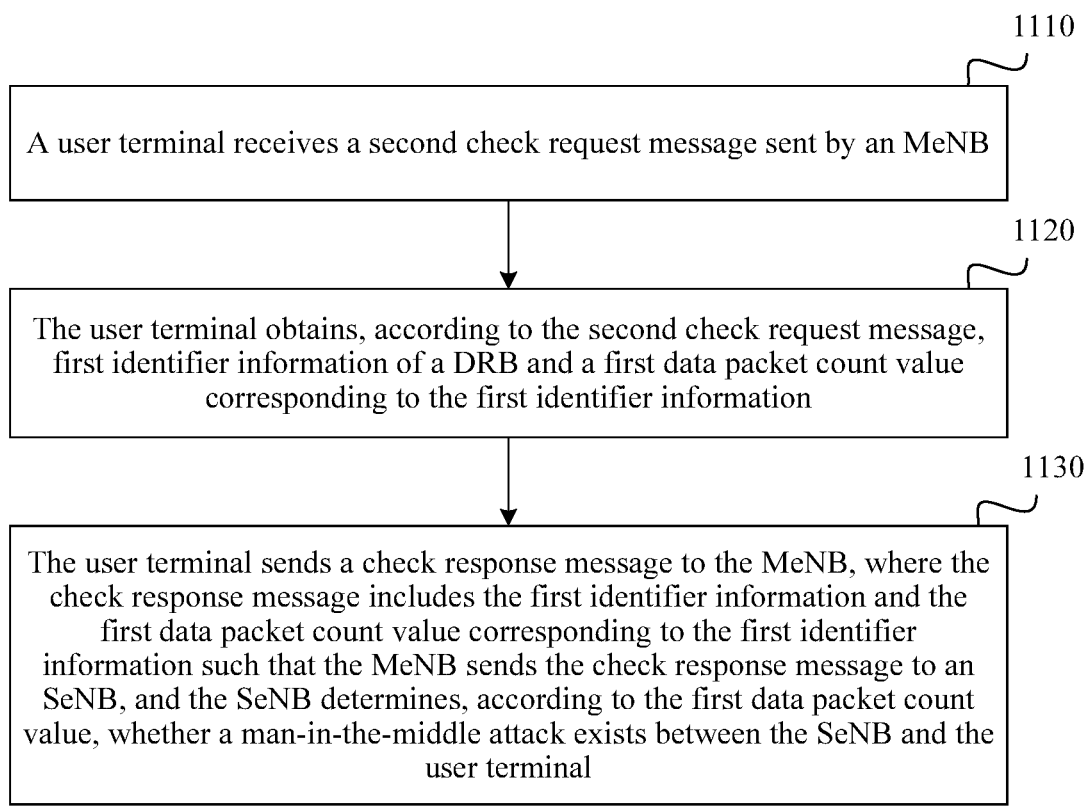
FIG. 11 is a flowchart of a method for detecting a man-in-the-middle attack according to Embodiment 9 of the present disclosure.

The following uses FIG. 11 as an example to describe in detail a method for detecting a man-in-the-middle attack provided in Embodiment 7 of the present disclosure. FIG. 11 is a flowchart of a method for detecting a man-in-the-middle attack according to Embodiment 7 of the present disclosure, and this embodiment of the present disclosure is executed by a user terminal UE. As shown in FIG. 11, this embodiment includes the following steps.

Step 1110: The user terminal receives a second check request message sent by an MeNB.

Further, the SeNB starts detection of a bearer between an SeNB and the UE, and the SeNB sends a first check request message to the MeNB, where the first check request message is used to enable the MeNB to generate the second check request message and send the second check request message to the UE.

The UE receives the second check request message sent by the MeNB.

A detailed process in which the MeNB generates the second check request message and sends the second check request message to the UE is described in detail in the foregoing Embodiment 8, and is not repeated here any further.

Step 1120: The user terminal obtains, according to the second check request message, first identifier information of a DRB and a first data packet count value corresponding to the first identifier information.

Further, the UE obtains, according to the second check request message, the first identifier information of the DRB between the UE and the SeNB and the first data packet count value corresponding to the first identifier information.

The first data packet count value further reflects a count, obtained by the SeNB, of sent and received data packets of the bearer between the SeNB and the UE.

It may be understood that there are multiple bearers between the SeNB and the UE, and each bearer has one piece of first identifier information. In this embodiment of the present disclosure, the first check request message may include at least two pieces of first identifier information corresponding to a bearer, and at least two corresponding first data packet count values.

Step 1130: The user terminal sends a check response message to the MeNB, where the check response message includes the first identifier information and the first data packet count value corresponding to the first identifier information such that the MeNB sends the check response message to an SeNB, and the SeNB determines, according to the first data packet count value, whether a man-in-the-middle attack exists between the SeNB and the user terminal.

Further, the UE adds the obtained first identifier information and the obtained first data packet count value to the check response message, and sends the check response message to the MeNB.

The check response message includes the first identifier information and the first data packet count value corresponding to the first identifier information such that the MeNB sends the check response message to the SeNB, and the SeNB determines, according to the first data packet count value, whether a man-in-the-middle attack exists between the SeNB and the UE.

Optionally, the first check request message received by the MeNB in step 1110 in this embodiment of the present disclosure further includes an identifier of the SeNB.

Further, the first identifier information is allocated by the SeNB when the first check request message includes the identifier of the SeNB.

Further, the first identifier information is allocated by the MeNB when the first check request message does not include the identifier of the SeNB.

In this embodiment of the present disclosure, the identifier of the SeNB is further carried in a subsequent check response message such that a receiver determines, according to the identifier, that the first identifier information is allocated by the SeNB when the first check request message includes the identifier of the SeNB.

In conclusion, according to the method for detecting a man-in-the-middle attack provided in this embodiment of the present disclosure, an SeNB initiates detection of a man-in-the-middle attack, UE receives a second check request message sent by an MeNB, and sends a check response message to the MeNB according to the second check request message, and the MeNB forwards the check response message to the SeNB such that the SeNB determines whether a man-in-the-middle attack exists between the SeNB and the UE. Therefore, a problem in the prior art that a scenario in which the SeNB offloads traffic of the MeNB is limited to some extent is resolved, and a case in which the MeNB, the SeNB, and the UE all participate in detection of a man-in-the-middle attack is implemented.

Figure 12:
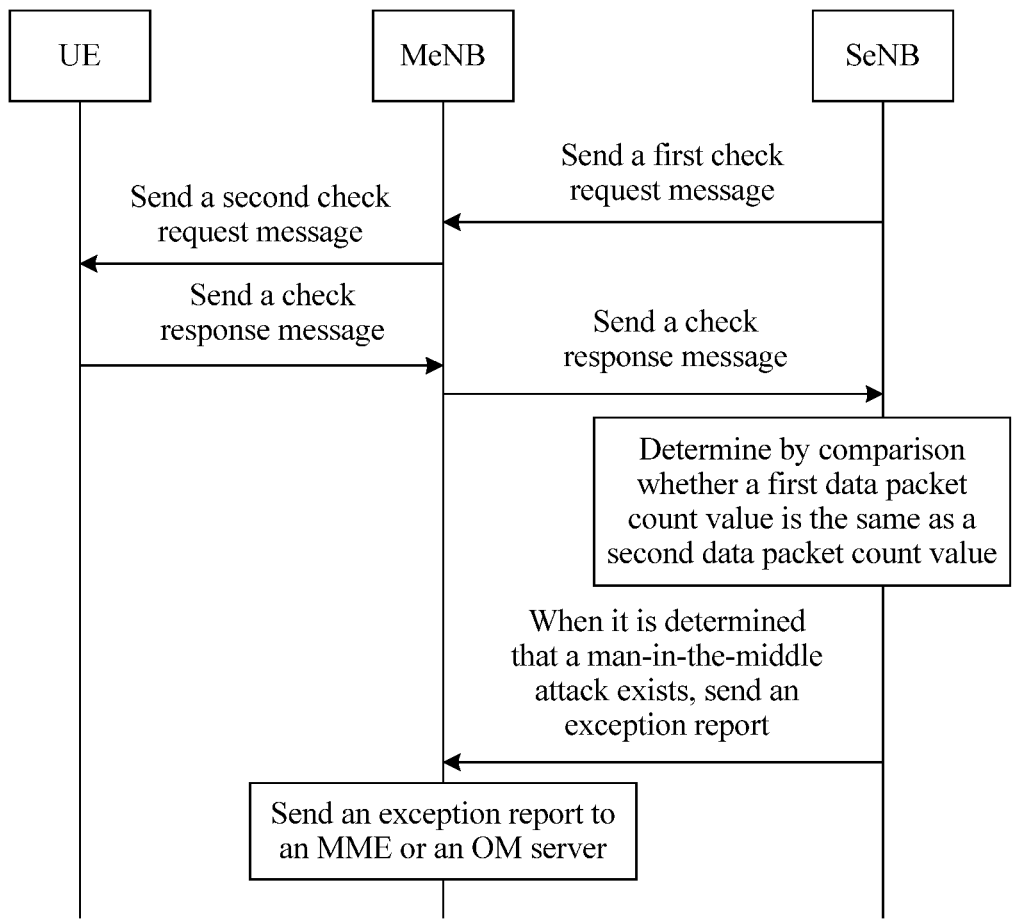
FIG. 12 is a signaling diagram of detection of a man-in-the-middle attack according to an embodiment of the present disclosure.

Further, FIG. 12 is a signaling diagram of detection of a man-in-the-middle attack according to Embodiment 7, Embodiment 8, and Embodiment 9 of the present disclosure, and the signaling diagram shown in FIG. 12 shows in detail a procedure of interaction among UE, an MeNB, and an SeNB. In FIG. 12, the SeNB compares a first data packet count value with a second data packet count value, thereby implementing a method for detecting a man-in-the-middle attack. The method for detecting a man-in-the-middle attack in FIG. 12 may be executed according to a process described in the foregoing embodiment, and is not repeated here any further.

Embodiment 10

Figure 13:
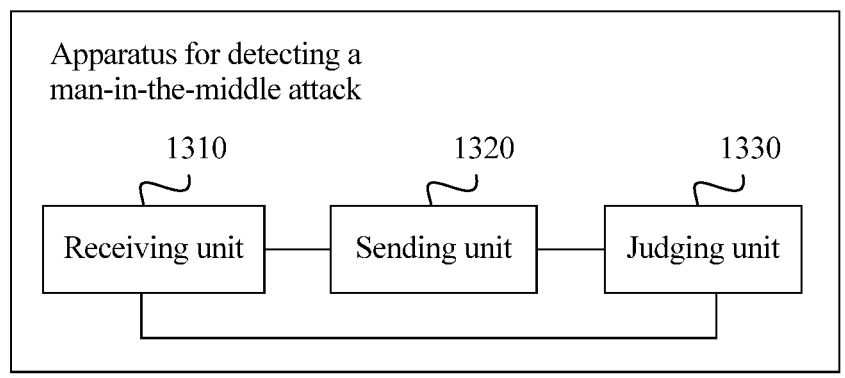
FIG. 13 is a schematic structural diagram of an apparatus for detecting a man-in-the-middle attack according to Embodiment 10 of the present disclosure.

Accordingly, an embodiment of the present disclosure further provides an apparatus for detecting a man-in-the-middle attack. An implementation structure of the apparatus is shown in FIG. 13, and the apparatus is configured to implement the method for detecting a man-in-the-middle attack in the foregoing Embodiment 1 of the present disclosure. The apparatus includes a receiving unit 1310, a sending unit 1320, and a judging unit 1330.

The receiving unit 1310 included in the apparatus is configured to receive a first check request message sent by an SeNB, where the first check request message includes first identifier information of an ERAB and a first data packet count value corresponding to the first identifier information.

The sending unit 1320 is configured to generate a second check request message according to the first identifier information, and send the second check request message to a user terminal, where the second check request message includes first indication information, the first indication information is used to instruct the user terminal to obtain second identifier information that matches the first identifier information, and a second data packet count value corresponding to the second identifier information, and the second identifier information is a DRB corresponding to the ERAB.

The receiving unit 1310 is further configured to receive a first check response message generated by the user terminal according to the second check request message, where the first check response message includes the second identifier information and the second data packet count value.

The judging unit 1330 is configured to determine that no man-in-the-middle attack exists between the SeNB and the user terminal when the first data packet count value corresponding to the first identifier information is the same as the second data packet count value corresponding to the second identifier information, or determine that a man-in-the-middle attack exists between the SeNB and the user terminal when the first data packet count value corresponding to the first identifier information is different from the second data packet count value corresponding to the second identifier information.

The first check request message received by the receiving unit 1310 further includes an identifier of the SeNB.

The sending unit 1320 is further configured to generate the second check request message according to the first identifier information and the identifier of the SeNB, and send the second check request message to the user terminal such that the user terminal obtains, according to the second check request message, the second identifier information that matches the first identifier information and the identifier of the SeNB, and the second data packet count value corresponding to the second identifier information.

The first check request message received by the receiving unit 1310 includes at least two pieces of first identifier information and at least two corresponding first data packet count values, and the first check response message received by the receiving unit 1310 includes at least two pieces of second identifier information and at least two corresponding second data packet count values.

The judging unit 1330 is further configured to determine that a man-in-the-middle attack exists between the SeNB and the user terminal when a first data packet count value corresponding to at least one piece of first identifier information is different from the second data packet count value corresponding to the second identifier information that matches the first identifier information.

The judging unit 1330 is further configured to determine that no man-in-the-middle attack exists between the SeNB and the user terminal when the first data packet count values corresponding to all the first identifier information are the same as the second data packet count value corresponding to the second identifier information that matches the first identifier information.

The sending unit 1320 is further configured to send a second check response message to the SeNB, where the second check response message includes second indication information, and the second indication information is used to indicate that no man-in-the-middle attack exists between the SeNB and the UE.

The sending unit 1320 is further configured to send an exception report to an MME or an O&M server.

The sending unit 1320 is further configured to send a third check response message to the SeNB, where the third check response message includes third indication information, and the third indication information is used to indicate that a man-in-the-middle attack exists between the SeNB and the user terminal.

In conclusion, according to the apparatus for detecting a man-in-the-middle attack provided in this embodiment of the present disclosure, an SeNB initiates detection of a man-in-the-middle attack, an MeNB receives a first data packet count value that is of a bearer between the SeNB and UE and is sent by the SeNB, and requires, according to the first data packet count value sent by the SeNB, the UE to report a second data packet count value of a bearer between the UE and the SeNB, and the MeNB determines that no man-in-the-middle attack exists between the SeNB and the user terminal, and notifies the SeNB when the first data packet count value is different from the second data packet count value. According to the technical solution and the apparatus in the present disclosure, in a scenario in which the SeNB offloads traffic of the MeNB, the MeNB, the SeNB, and the UE all can participate in detection of a man-in-the-middle attack.

Embodiment 11

Figure 14:
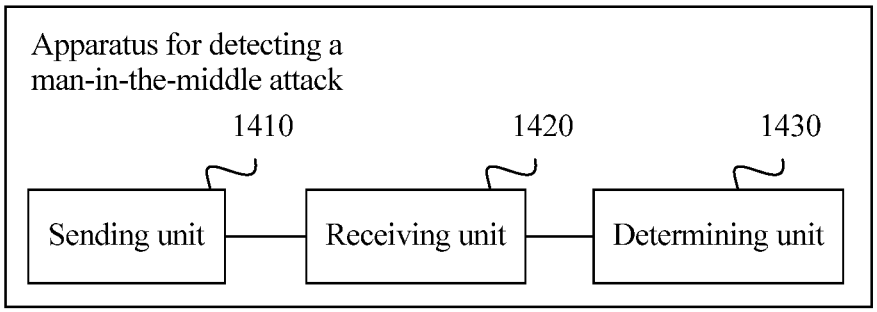
FIG. 14 is a schematic structural diagram of an apparatus for detecting a man-in-the-middle attack according to Embodiment 11 of the present disclosure.

Accordingly, an embodiment of the present disclosure further provides an apparatus for detecting a man-in-the-middle attack. An implementation structure of the apparatus is shown in FIG. 14, and the apparatus is configured to implement the method for detecting a man-in-the-middle attack in the foregoing Embodiment 2 of the present disclosure. The apparatus includes a sending unit 1410, a receiving unit 1420, and a determining unit 1430.

The sending unit 1410 included in the apparatus is configured to send a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal.

The receiving unit 1420 is configured to receive the check response message sent by the MeNB.

The determining unit 1430 is configured to determine, according to the second indication information, that no man-in-the-middle attack exists between the SeNB and the user terminal when the check response message is a second check response message and the second check response message includes second indication information, or determine, according to the third indication information, that a man-in-the-middle attack exists between the SeNB and the user terminal, and take a preset measure for processing when the check response message is a third check response message and the third check response message includes third indication information.

The first check request message sent by the sending unit 1410 further includes an identifier of the SeNB.

The sending unit 1410 is further configured to send the first check request message to the MeNB, where the first check request message includes the identifier of the apparatus, the first identifier information of the ERAB, and the first data packet count value corresponding to the first identifier information, and the first check request message is used to enable the MeNB to generate the second check request message according to the first identifier information and the identifier of the apparatus, and send the second check request message to the user terminal.

In conclusion, according to the apparatus for detecting a man-in-the-middle attack provided in this embodiment of the present disclosure, an SeNB initiates detection of a man-in-the-middle attack, and the SeNB receives a check response message sent by an MeNB, and determines, according to the check response message, whether a man-in-the-middle attack exists between the SeNB and UE. According to the technical solution of the present disclosure, in a scenario in which the SeNB offloads traffic of the MeNB, the MeNB, the SeNB, and the UE all can participate in detection of a man-in-the-middle attack.

Embodiment 12

Figure 15:
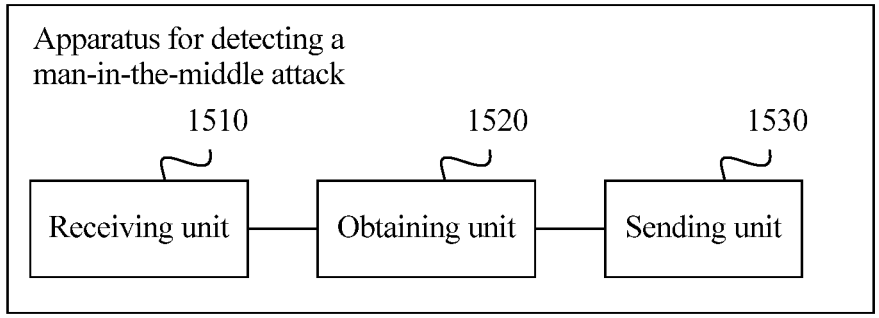
FIG. 15 is a schematic structural diagram of an apparatus for detecting a man-in-the-middle attack according to Embodiment 12 of the present disclosure.

Accordingly, an embodiment of the present disclosure further provides an apparatus for detecting a man-in-the-middle attack. An implementation structure of the apparatus is shown in FIG. 15, and the apparatus is configured to implement the method for detecting a man-in-the-middle attack in the foregoing Embodiment 3 of the present disclosure. The apparatus includes a receiving unit 1510, an obtaining unit 1520, and a sending unit 1530.

The receiving unit 1510 included in the apparatus is configured to receive a second check request message sent by the MeNB, where the second check request message includes second identifier information corresponding to first identifier information of an ERAB, and the second identifier information is a DRB corresponding to the ERAB.

The obtaining unit 1520 is configured to obtain the second identifier information corresponding to the first identifier information, and a second data packet count value corresponding to the second identifier information.

The sending unit 1530 is configured to send the second identifier information and the second data packet count value corresponding to the second identifier information to the MeNB such that the MeNB determines, according to a first data packet count value and the second data packet count value, whether a man-in-the-middle attack exists.

In conclusion, according to the apparatus for detecting a man-in-the-middle attack provided in this embodiment of the present disclosure, an SeNB initiates detection of a man-in-the-middle attack, and UE obtains second identifier information and a second data packet count value according to first identifier information, and sends the second data packet count value to an MeNB such that the MeNB determines, according to a first data packet count value and the second data packet count value, whether a man-in-the-middle attack exists between the SeNB and the UE, and notifies the SeNB. According to the technical solution of the present disclosure, in a scenario in which the SeNB offloads traffic of the MeNB, the MeNB, the SeNB, and the UE all can participate in detection of a man-in-the-middle attack.

Embodiment 13

Figure 16:
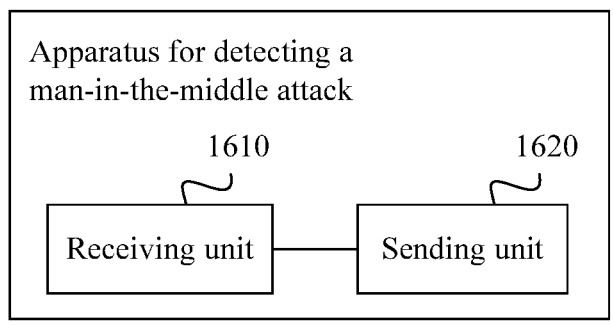
FIG. 16 is a schematic structural diagram of an apparatus for detecting a man-in-the-middle attack according to Embodiment 13 of the present disclosure.

Accordingly, an embodiment of the present disclosure further provides an apparatus for detecting a man-in-the-middle attack. An implementation structure of the apparatus is shown in FIG. 16, and the apparatus is configured to implement the method for detecting a man-in-the-middle attack in the foregoing Embodiment 4 of the present disclosure. The apparatus includes a receiving unit 1610 and a sending unit 1620.

The receiving unit 1610 included in the apparatus is configured to receive a first check request message sent by an SeNB, where the first check request message includes first identifier information of an ERAB and a first data packet count value corresponding to the first identifier information.

The sending unit 1620 is configured to generate a second check request message according to the first identifier information and the first data packet count value corresponding to the first identifier information, and send the second check request message to a user terminal, where the second check request message includes first indication information, the first indication information is used to instruct the user terminal to obtain second identifier information that matches the first identifier information, and a second data packet count value corresponding to the second identifier information, and determine by comparison whether the first data packet count value corresponding to the first identifier information is the same as the second data packet count value corresponding to the second identifier information, and the second identifier information is a DRB corresponding to the ERAB.

The receiving unit 1610 is further configured to receive a check response message generated by the user terminal according to the second check request message, and send the check response message to the SeNB such that the SeNB performs processing according to the response message.

The first check request message received by the receiving unit 1610 further includes an identifier of the SeNB.

The sending unit 1620 is further configured to generate the second check request message according to the identifier of the SeNB, the first identifier information, and the first data packet count value corresponding to the first identifier information, and send the second check request message to the user terminal, where the second check request message includes the first indication information, and the first indication information is used to instruct the user terminal to obtain the second identifier information that matches the first identifier information and the identifier of the SeNB, and the second data packet count value corresponding to the second identifier information, and determine by comparison whether the first data packet count value corresponding to the first identifier information is the same as the second data packet count value corresponding to the second identifier information.

The sending unit 1620 is further configured to send the exception report to an MME or an O&M server when the receiving unit 1610 receives an exception report sent by the SeNB.

In conclusion, according to the apparatus for detecting a man-in-the-middle attack provided in this embodiment of the present disclosure, an SeNB initiates detection of a man-in-the-middle attack, an MeNB sends a second check request message to UE according to a first check request message sent by the SeNB, and the MeNB receives a check response message sent by the UE, and forwards the check response message to the SeNB when the UE determines, according to the second check request message, that a man-in-the-middle attack exists between the SeNB and the UE. According to the technical solution of the present disclosure, in a scenario in which the SeNB offloads traffic of the MeNB, the MeNB, the SeNB, and the UE all can participate in detection of a man-in-the-middle attack.

Embodiment 14

Figure 17:
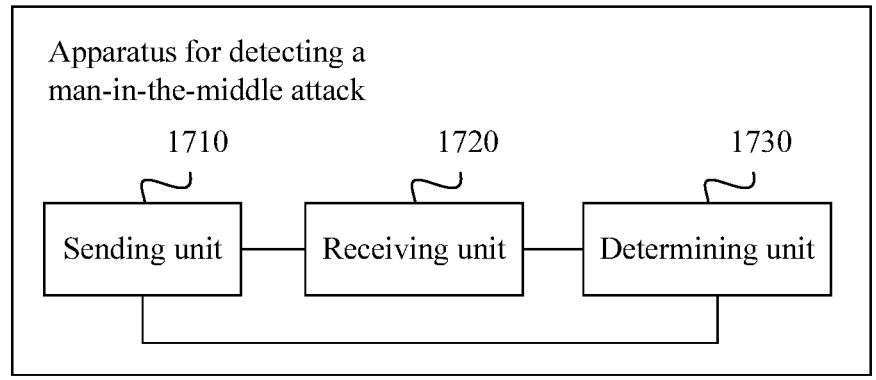
FIG. 17 is a schematic structural diagram of an apparatus for detecting a man-in-the-middle attack according to Embodiment 14 of the present disclosure.

Accordingly, an embodiment of the present disclosure further provides an apparatus for detecting a man-in-the-middle attack. An implementation structure of the apparatus is shown in FIG. 17, and the apparatus is configured to implement the method for detecting a man-in-the-middle attack in the foregoing Embodiment 5 of the present disclosure. The apparatus includes a sending unit 1710, a receiving unit 1720, and a determining unit 1730.

The sending unit 1710 included in the apparatus is configured to send a first check request message to an MeNB, where the first check request message includes first indication information, and the first indication information is used to instruct the MeNB to send a second check request message to a user terminal.

The receiving unit 1720 is configured to receive a check response message sent by the MeNB.

The determining unit 1730 is configured to determine, according to the check response message, whether a man-in-the-middle attack exists.

The sending unit 1710 is further configured to take a preset measure for processing and send an exception report to the MeNB when the determining unit 1730 determines that the man-in-the-middle attack exists.

In conclusion, according to the apparatus for detecting a man-in-the-middle attack provided in this embodiment of the present disclosure, an SeNB initiates detection of a man-in-the-middle attack, and the SeNB receives a check response message sent by an MeNB, and determines whether a man-in-the-middle attack exists between the SeNB and the UE when UE determines that a man-in-the-middle attack exists between the SeNB and the UE. According to the technical solution of the present disclosure, in a scenario in which the SeNB offloads traffic of the MeNB, the MeNB, the SeNB, and the UE all can participate in detection of a man-in-the-middle attack.

Embodiment 15

Figure 18:
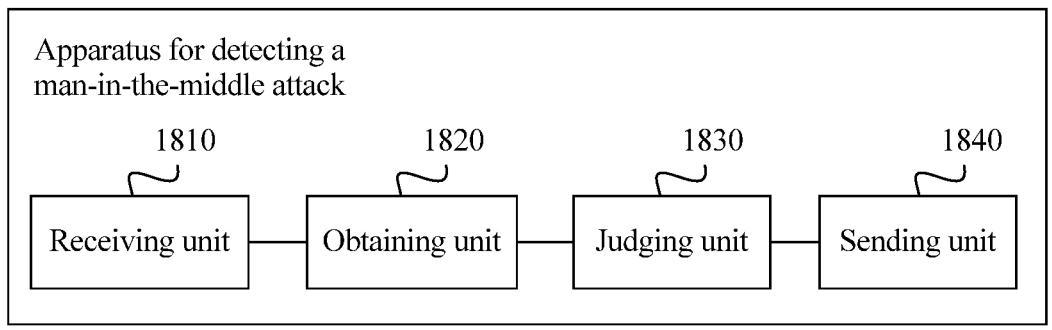
FIG. 18 is a schematic structural diagram of an apparatus for detecting a man-in-the-middle attack according to Embodiment 15 of the present disclosure.

Accordingly, an embodiment of the present disclosure further provides an apparatus for detecting a man-in-the-middle attack. An implementation structure of the apparatus is shown in FIG. 18, and the apparatus is configured to implement the method for detecting a man-in-the-middle attack in the foregoing Embodiment 6 of the present disclosure. The apparatus includes a receiving unit 1810, an obtaining unit 1820, a judging unit 1830, and a sending unit 1840.

The receiving unit 1810 included in the apparatus is configured to receive a second check request message sent by an MeNB, where the second check request message includes second identifier information corresponding to first identifier information of an ERAB, and a first data packet count value corresponding to the first identifier information, and the second identifier information is a DRB corresponding to the ERAB.

The obtaining unit 1820 is configured to obtain the second identifier information corresponding to the first identifier information, and a second data packet count value corresponding to the second identifier information.

The judging unit 1830 is configured to determine, according to the first data packet count value corresponding to the first identifier information, and the second data packet count value corresponding to the second identifier information, whether a man-in-the-middle attack exists between an SeNB and the apparatus.

The sending unit 1840 is configured to generate a check response message according to a result determined by the judging unit 1830, and send the check response message to the MeNB.

The judging unit 1830 is further configured to determine that no man-in-the-middle attack exists between the SeNB and the apparatus when the first data packet count value corresponding to the first identifier information is the same as the second data packet count value corresponding to the second identifier information, or determine that a man-in-the-middle attack exists between the SeNB and the apparatus when the first data packet count value corresponding to the first identifier information is different from the second data packet count value corresponding to the second identifier information.

In conclusion, according to the apparatus for detecting a man-in-the-middle attack provided in this embodiment of the present disclosure, an SeNB initiates detection of a man-in-the-middle attack, UE determines, according to a second check request message sent by an MeNB, whether a man-in-the-middle attack exists between the SeNB and the UE, and the UE sends a check response message to the MeNB when the UE determines that a man-in-the-middle attack exists between the SeNB and the UE. According to the technical solution of the present disclosure, in a scenario in which the SeNB offloads traffic of the MeNB, the MeNB, the SeNB, and the UE all can participate in detection of a man-in-the-middle attack.

Embodiment 16

Figure 19:
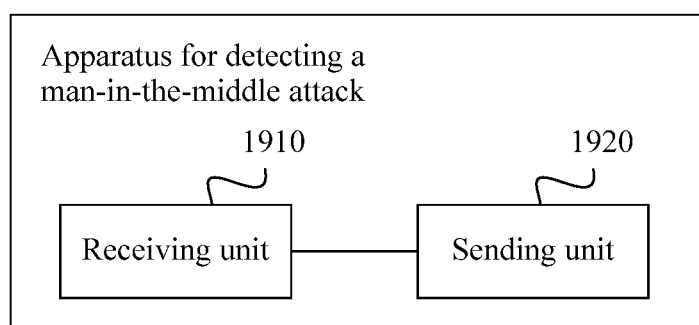
FIG. 19 is a schematic structural diagram of an apparatus for detecting a man-in-the-middle attack according to Embodiment 16 of the present disclosure.

Accordingly, an embodiment of the present disclosure further provides an apparatus for detecting a man-in-the-middle attack. An implementation structure of the apparatus is shown in FIG. 19, and the apparatus is configured to implement the method for detecting a man-in-the-middle attack in the foregoing Embodiment 7 of the present disclosure. The apparatus includes a receiving unit 1910 and a sending unit 1920.

The receiving unit 1910 included in the apparatus is configured to receive a first check request message sent by an SeNB.

The sending unit 1920 is configured to generate a second check request message according to the first check request message, and send the second check request message to a user terminal, where the second check request message includes first indication information, and the first indication information is used to instruct the user terminal to obtain first identifier information of a DRB and a first data packet count value corresponding to the first identifier information.

The receiving unit 1910 is further configured to receive a check response message generated by the user terminal according to the second check request message, and send the check response message to the SeNB, where the response message includes the first identifier information and the first data packet count value corresponding to the first identifier information such that the SeNB determines, according to the first data packet count value, whether a man-in-the-middle attack exists.

The first check request message received by the receiving unit 1910 further includes an identifier of the SeNB.

The sending unit 1920 is further configured to generate the second check request message according to the identifier of the SeNB and the first check request message, and send the second check request message to the user terminal, where the second check request message includes the first indication information, and the first indication information is used to instruct the user terminal to obtain the first identifier information of the DRB and the first data packet count value corresponding to the first identifier information.

The sending unit 1920 is further configured to send the exception report to an MME or an O&M server when the receiving unit 1910 receives an exception report sent by the SeNB.

In conclusion, according to the apparatus for detecting a man-in-the-middle attack provided in this embodiment of the present disclosure, an SeNB initiates detection of a man-in-the-middle attack, and an MeNB sends a second check request message to UE according to a first check request message sent by the SeNB, and forwards, to the SeNB, a check response message fed back by the UE such that the SeNB determines whether a man-in-the-middle attack exists between the SeNB and the UE, and notifies the MeNB. According to the technical solution of the present disclosure, in a scenario in which the SeNB offloads traffic of the MeNB, the MeNB, the SeNB, and the UE all can participate in detection of a man-in-the-middle attack.

Embodiment 17

Figure 20:
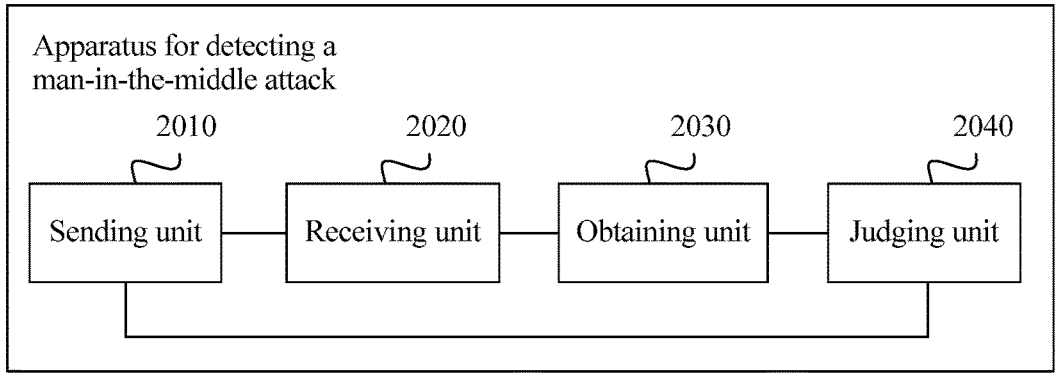
FIG. 20 is a schematic structural diagram of an apparatus for detecting a man-in-the-middle attack according to Embodiment 17 of the present disclosure.

Accordingly, an embodiment of the present disclosure further provides an apparatus for detecting a man-in-the-middle attack. An implementation structure of the apparatus is shown in FIG. 20, and the apparatus is configured to implement the method for detecting a man-in-the-middle attack in the foregoing Embodiment 8 of the present disclosure. The apparatus includes a sending unit 2010, a receiving unit 2020, an obtaining unit 2030, and a judging unit 2040.

The sending unit 2010 included in the apparatus is configured to send a first check request message to an MeNB, where the first check request message is used to enable the MeNB to generate a second check request message according to the first check request message, and send the second check request message to a user terminal.

The receiving unit 2020 is configured to receive a check response message sent by the MeNB, where the check response message includes first identifier information of a DRB and a first data packet count value corresponding to the first identifier information.

The obtaining unit 2030 is configured to obtain, according to the first identifier information, second identifier information that matches the first identifier information, and a second data packet count value corresponding to the second identifier information, where the second identifier information is an ERAB corresponding to the DRB.

The judging unit 2040 is configured to determine, according to the first data packet count value and the second data packet count value, whether a man-in-the-middle attack exists.

The sending unit 2010 is further configured to take a preset measure for processing and send an exception report to the MeNB when the judging unit 2040 determines that the man-in-the-middle attack exists.

The judging unit 2040 is further configured to determine that no man-in-the-middle attack exists between the apparatus and the user terminal when the first data packet count value corresponding to the first identifier information is the same as the second data packet count value corresponding to the second identifier information, or determine that a man-in-the-middle attack exists between the apparatus and the user terminal when the first data packet count value corresponding to the first identifier information is different from the second data packet count value corresponding to the second identifier information.

In conclusion, according to the apparatus for detecting a man-in-the-middle attack provided in this embodiment of the present disclosure, an SeNB initiates detection of a man-in-the-middle attack, and requires UE to report a first data packet count value of a bearer between the UE and the SeNB, and the SeNB determines, according to the first data packet count value and an obtained second data packet count value stored by the SeNB, whether a man-in-the-middle attack exists between the SeNB and the UE, and notifies an MeNB. According to the technical solution of the present disclosure, in a scenario in which the SeNB offloads traffic of the MeNB, the MeNB, the SeNB, and the UE all can participate in detection of a man-in-the-middle attack.

Embodiment 18

Figure 21:
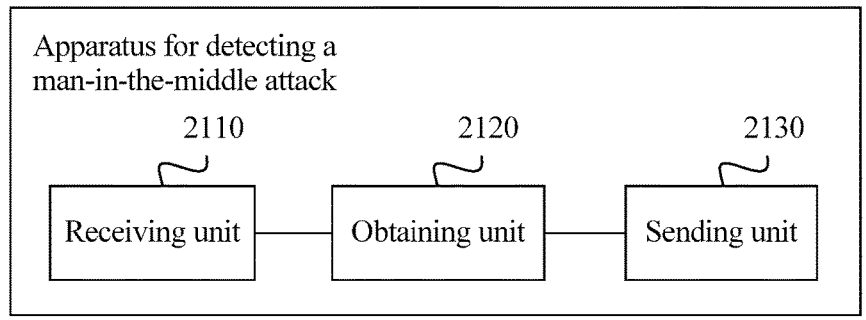
FIG. 21 is a schematic structural diagram of an apparatus for detecting a man-in-the-middle attack according to Embodiment 18 of the present disclosure.

Accordingly, an embodiment of the present disclosure further provides an apparatus for detecting a man-in-the-middle attack. An implementation structure of the apparatus is shown in FIG. 21, and the apparatus is configured to implement the method for detecting a man-in-the-middle attack in the foregoing Embodiment 9 of the present disclosure. The apparatus includes a receiving unit 2110, an obtaining unit 2120, and a sending unit 2130.

The receiving unit 2110 included in the apparatus is configured to receive a second check request message sent by an MeNB.

The obtaining unit 2120 is configured to obtain, according to the second check request message, first identifier information of a DRB and a first data packet count value corresponding to the first identifier information.

The sending unit 2130 is configured to send a check response message to the MeNB, where the check response message includes the first identifier information and the first data packet count value corresponding to the first identifier information such that the MeNB sends the check response message to an SeNB, and the SeNB determines, according to the first data packet count value, whether a man-in-the-middle attack exists between the SeNB and the apparatus.

In conclusion, according to the apparatus for detecting a man-in-the-middle attack provided in this embodiment of the present disclosure, an SeNB initiates detection of a man-in-the-middle attack, UE receives a second check request message sent by an MeNB, and sends a check response message to the MeNB according to the second check request message, and the MeNB forwards the check response message to the SeNB such that the SeNB determines whether a man-in-the-middle attack exists between the SeNB and the UE. According to the technical solution of the present disclosure, in a scenario in which the SeNB offloads traffic of the MeNB, the MeNB, the SeNB, and the UE all can participate in detection of a man-in-the-middle attack.

Embodiment 19

Figure 22:
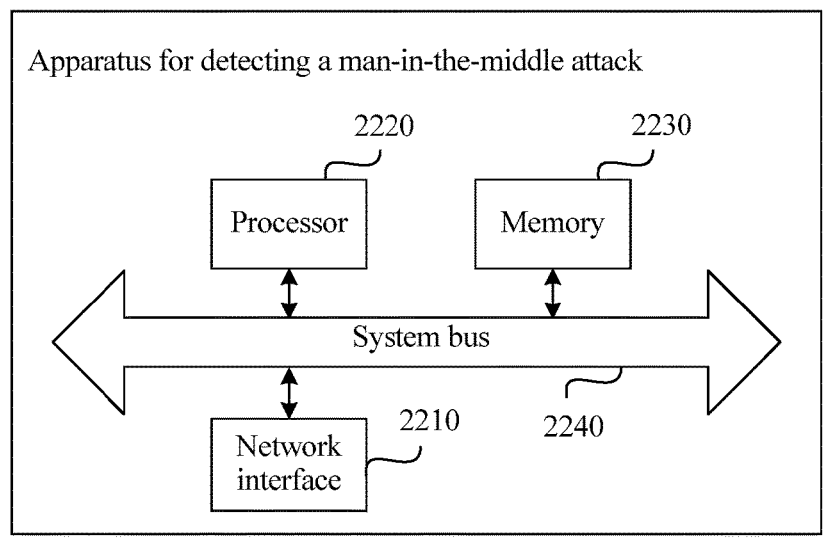
FIG. 22 is a schematic structural diagram of hardware of an apparatus for detecting a man-in-the-middle attack according to Embodiment 19 of the present disclosure.

In addition, the apparatus for detecting a man-in-the-middle attack provided in Embodiment 10 of the present disclosure may also be implemented in the following manner in order to implement the foregoing method for detecting a man-in-the-middle attack in Embodiment 1 of the present disclosure. As shown in FIG. 22, the apparatus for detecting a man-in-the-middle attack includes a network interface 2210, a processor 2220, a memory 2230 and a system bus 2240. The system bus 2240 is configured to connect the network interface 2210, the processor 2220, and the memory 2230.

The network interface 2210 is configured to perform interaction and communication with UE and an SeNB.

The memory 2230 may be a permanent memory, for example, a hard disk drive and a flash memory, and the memory 2230 is configured to store an application program, where the application program may be used to enable the processor 2220 to access and execute the following instructions of receiving a first check request message sent by an SeNB, where the first check request message includes first identifier information of an ERAB and a first data packet count value corresponding to the first identifier information, generating a second check request message according to the first identifier information, and sending the second check request message to a user terminal, where the second check request message includes first indication information, the first indication information is used to instruct the user terminal to obtain second identifier information that matches the first identifier information, and a second data packet count value corresponding to the second identifier information, and the second identifier information is a DRB corresponding to the ERAB, receiving a first check response message generated by the user terminal according to the second check request message, where the first check response message includes the second identifier information and the second data packet count value, and determining that no man-in-the-middle attack exists between the SeNB and the user terminal when the first data packet count value corresponding to the first identifier information is the same as the second data packet count value corresponding to the second identifier information, or determining that a man-in-the-middle attack exists between the SeNB and the user terminal when the first data packet count value corresponding to the first identifier information is different from the second data packet count value corresponding to the second identifier information.

The first check request message further includes an identifier of the SeNB.

The application program stored in the memory 2230 further includes an instruction that may be used to enable the processor 2220 to execute a process of generating a second check request message according to the first identifier information, and sending the second check request message to a user terminal, where the second check request message includes first indication information, the first indication information is used to enable the user terminal to obtain second identifier information that matches the first identifier information, and a second data packet count value corresponding to the second identifier information, and the process includes generating the second check request message according to the first identifier information and the identifier of the SeNB, and sending the second check request message to the user terminal such that the user terminal obtains, according to the second check request message, the second identifier information that matches the first identifier information and the identifier of the SeNB, and the second data packet count value corresponding to the second identifier information.

Further, the first check request message includes at least two pieces of first identifier information and at least two corresponding first data packet count values, and the first check response message includes at least two pieces of second identifier information and at least two corresponding second data packet count values.

The application program stored in the memory 2230 further includes an instruction that may be used to enable the processor 2220 to execute a process of the determining that a man-in-the-middle attack exists between the SeNB and the user terminal when the first data packet count value corresponding to the first identifier information is different from the second data packet count value corresponding to the second identifier information, and the process includes determining that a man-in-the-middle attack exists between the SeNB and the user terminal when a first data packet count value corresponding to at least one piece of first identifier information is different from the second data packet count value corresponding to the second identifier information that matches the first identifier information.

The application program stored in the memory 2230 further includes an instruction that may be used to enable the processor 2220 to execute a process of the determining that no man-in-the-middle attack exists between the SeNB and the user terminal when the first data packet count value corresponding to the first identifier information is the same as the second data packet count value corresponding to the second identifier information and the process includes determining that no man-in-the-middle attack exists between the SeNB and the user terminal when the first data packet count values corresponding to all the first identifier information are the same as the second data packet count value corresponding to the second identifier information that matches the first identifier information.

The application program stored in the memory 2230 further includes an instruction that may be used to enable the processor 2220 to execute the process of sending a second check response message to the SeNB, where the second check response message includes second indication information, and the second indication information is used to indicate that no man-in-the-middle attack exists between the SeNB and the UE.

The application program stored in the memory 2230 further includes an instruction that may be used to enable the processor 2220 to execute the process of sending an exception report to an MME or an O&M server.

The application program stored in the memory 2230 further includes an instruction that may be used to enable the processor 2220 to execute the process of sending a third check response message to the SeNB, where the third check response message includes third indication information, and the third indication information is used to indicate that a man-in-the-middle attack exists between the SeNB and the user terminal.

In addition, as shown in FIG. 22, the apparatus for detecting a man-in-the-middle attack provided in Embodiment 13 of the present disclosure may also be implemented in the following manner in order to implement the foregoing method for detecting a man-in-the-middle attack in Embodiment 4 of the present disclosure.

The memory 2230 may be a permanent memory, for example, a hard disk drive and a flash memory, and the memory 2230 is configured to store an application program, where the application program may be used to enable the processor 2220 to access and execute the instructions of receiving a first check request message sent by an SeNB, where the first check request message includes first identifier information of an ERAB and a first data packet count value corresponding to the first identifier information, generating a second check request message according to the first identifier information and the first data packet count value corresponding to the first identifier information, and sending the second check request message to a user terminal, where the second check request message includes first indication information, the first indication information is used to instruct the user terminal to obtain second identifier information that matches the first identifier information, and a second data packet count value corresponding to the second identifier information, and determine by comparison whether the first data packet count value corresponding to the first identifier information is the same as the second data packet count value corresponding to the second identifier information, and the second identifier information is a DRB corresponding to the ERAB, and receiving a check response message generated by the user terminal according to the second check request message, and sending the check response message to the SeNB such that the SeNB performs processing according to the response message.

The first check request message further includes an identifier of the SeNB.

The application program stored in the memory 2230 further includes an instruction that may be used to enable the processor 2220 to execute a process of generating a second check request message according to the first identifier information and the first data packet count value corresponding to the first identifier information, and sending the second check request message to a user terminal, where the second check request message includes first indication information, and the first indication information is used to instruct the user terminal to obtain second identifier information that matches the first identifier information, and a second data packet count value corresponding to the second identifier information, and determine by comparison whether the first data packet count value corresponding to the first identifier information is the same as the second data packet count value corresponding to the second identifier information, and the process includes generating the second check request message according to the identifier of the SeNB, the first identifier information, and the first data packet count value corresponding to the first identifier information, and sending the second check request message to the user terminal, where the second check request message includes the first indication information, and the first indication information is used to instruct the user terminal to obtain the second identifier information that matches the first identifier information and the identifier of the SeNB, and the second data packet count value corresponding to the second identifier information, and determine by comparison whether the first data packet count value corresponding to the first identifier information is the same as the second data packet count value corresponding to the second identifier information.

The application program stored in the memory 2230 further includes an instruction that may be used to enable the processor 2220 to execute the process of sending the exception report to an MME or an O&M server when the MeNB receives an exception report sent by the SeNB.

In addition, as shown in FIG. 22, the apparatus for detecting a man-in-the-middle attack provided in Embodiment 16 of the present disclosure may also be implemented in the following manner in order to implement the foregoing method for detecting a man-in-the-middle attack in Embodiment 7 of the present disclosure.

The memory 2230 may be a permanent memory, for example, a hard disk drive and a flash memory, and the memory 2230 is configured to store an application program, where the application program may be used to enable the processor 2220 to access and execute the instructions of receiving a first check request message sent by an SeNB, generating a second check request message according to the first check request message, and sending the second check request message to a user terminal, where the second check request message includes first indication information, and the first indication information is used to instruct the user terminal to obtain first identifier information of a DRB and a first data packet count value corresponding to the first identifier information, and receiving a check response message generated by the user terminal according to the second check request message, and sending the check response message to the SeNB, where the response message includes the first identifier information and the first data packet count value corresponding to the first identifier information such that the SeNB determines, according to the first data packet count value, whether a man-in-the-middle attack exists.

The first check request message further includes an identifier of the SeNB.

The application program stored in the memory 2230 further includes an instruction that may be used to enable the processor 2220 to execute a process of generating a second check request message according to the first check request message, and sending the second check request message to a user terminal, where the second check request message includes first indication information, and the first indication information is used to instruct the user terminal to obtain first identifier information of a DRB and a first data packet count value corresponding to the first identifier information, and the process includes generating the second check request message according to the identifier of the SeNB and the first check request message, and sending the second check request message to the user terminal, where the second check request message includes the first indication information, and the first indication information is used to instruct the user terminal to obtain the first identifier information of the DRB and the first data packet count value corresponding to the first identifier information.

Further, the application program stored in the memory 2230 further includes an instruction that may be used to enable the processor 2220 to execute the process of sending the exception report to an MME or an O&M server when the apparatus receives an exception report sent by the SeNB.

Embodiment 20

Figure 23:
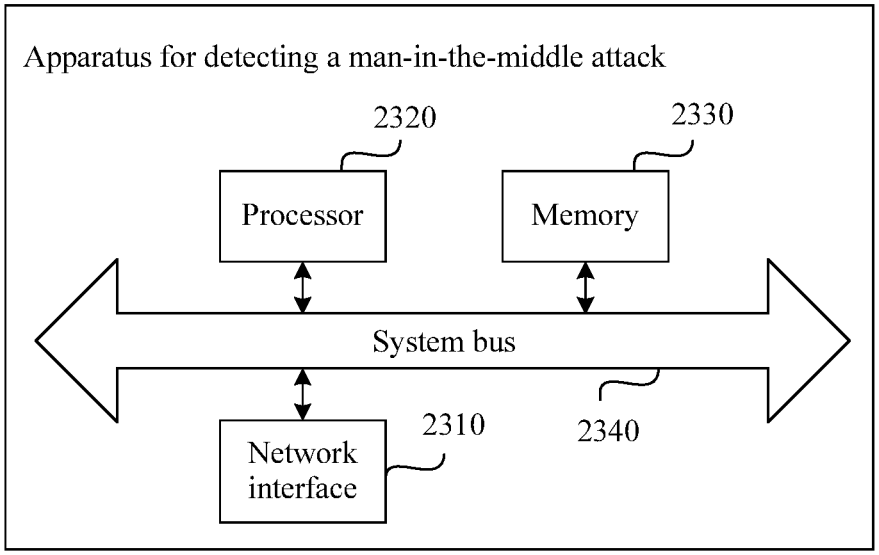
FIG. 23 is a schematic structural diagram of hardware of an apparatus for detecting a man-in-the-middle attack according to Embodiment 20 of the present disclosure.

In addition, the apparatus for detecting a man-in-the-middle attack provided in Embodiment 11 of the present disclosure may also be implemented in the following manner in order to implement the foregoing method for detecting a man-in-the-middle attack in Embodiment 2 of the present disclosure. As shown in FIG. 23, the apparatus for detecting a man-in-the-middle attack includes a network interface 2310, a processor 2320, and a memory 2330. A system bus 2340 is configured to connect the network interface 2310, the processor 2320, and the memory 2330.

The network interface 2310 is configured to perform interaction and communication with an MeNB and UE.

The memory 2330 may be a permanent memory, for example, a hard disk drive and a flash memory, and the memory 2330 is configured to store an application program, where the application program may be used to enable the processor 2320 to access and execute the instructions of sending a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal, receiving the check response message sent by the MeNB, and determining, according to the second indication information, that no man-in-the-middle attack exists between the SeNB and the user terminal when the check response message is a second check response message and the second check response message includes second indication information, or determining, according to the third indication information, that a man-in-the-middle attack exists between the SeNB and the user terminal, and taking a preset measure for processing when the check response message is a third check response message and the third check response message includes third indication information.

The first check request message further includes an identifier of the apparatus.

The application program stored in the memory 2330 further includes an instruction that may be used to enable the processor 2320 to execute a process of sending a first check request message to an MeNB, where the first check request message includes first identifier information of an ERAB and a first data packet count value corresponding to the first identifier information, and the first check request message is used to enable the MeNB to generate a second check request message according to the first identifier information, and send the second check request message to a user terminal, and the process includes sending the first check request message to the MeNB, where the first check request message includes the identifier of the apparatus, the first identifier information of the ERAB, and the first data packet count value corresponding to the first identifier information, and the first check request message is used to enable the MeNB to generate the second check request message according to the first identifier information and the identifier of the SeNB, and send the second check request message to the user terminal.

In addition, as shown in FIG. 23, the apparatus for detecting a man-in-the-middle attack provided in Embodiment 14 of the present disclosure may also be implemented in the following manner in order to implement the foregoing method for detecting a man-in-the-middle attack in Embodiment 5 of the present disclosure.

The memory 2330 may be a permanent memory, for example, a hard disk drive and a flash memory, and the memory 2330 is configured to store an application program, where the application program may be used to enable the processor 2320 to access and execute the following instructions sending a first check request message to an MeNB, where the first check request message includes first indication information, and the first indication information is used to instruct the MeNB to send a second check request message to a user terminal, receiving a check response message sent by the MeNB, determining, according to the check response message, whether a man-in-the-middle attack exists, and taking a preset measure for processing and sending an exception report to the MeNB when the man-in-the-middle attack exists.

In addition, as shown in FIG. 23, the apparatus for detecting a man-in-the-middle attack provided in Embodiment 17 of the present disclosure may also be implemented in the following manner in order to implement the foregoing method for detecting a man-in-the-middle attack in Embodiment 8 of the present disclosure.

The memory 2330 may be a permanent memory, for example, a hard disk drive and a flash memory, and the memory 2330 is configured to store an application program, where the application program may be used to enable the processor 2320 to access and execute the instructions of sending a first check request message to an MeNB, where the first check request message is used to enable the MeNB to generate a second check request message according to the first check request message, and send the second check request message to a user terminal, receiving a check response message sent by the MeNB, where the check response message includes first identifier information of a DRB and a first data packet count value corresponding to the first identifier information, obtaining, according to the first identifier information, second identifier information that matches the first identifier information, and a second data packet count value corresponding to the second identifier information, where the second identifier information is an ERAB corresponding to the DRB, determining, according to the first data packet count value and the second data packet count value, whether a man-in-the-middle attack exists, and taking a preset measure for processing and sending an exception report to the MeNB when the man-in-the-middle attack exists.

The application program stored in the memory 2330 further includes an instruction that may be used to enable the processor 2320 to execute a process of determining, according to the first data packet count value and the second data packet count value, whether a man-in-the-middle attack exists determining that no man-in-the-middle attack exists between the apparatus and the user terminal when the first data packet count value corresponding to the first identifier information is the same as the second data packet count value corresponding to the second identifier information, or determining that a man-in-the-middle attack exists between the apparatus and the user terminal when the first data packet count value corresponding to the first identifier information is different from the second data packet count value corresponding to the second identifier information.

Embodiment 21

Figure 24:
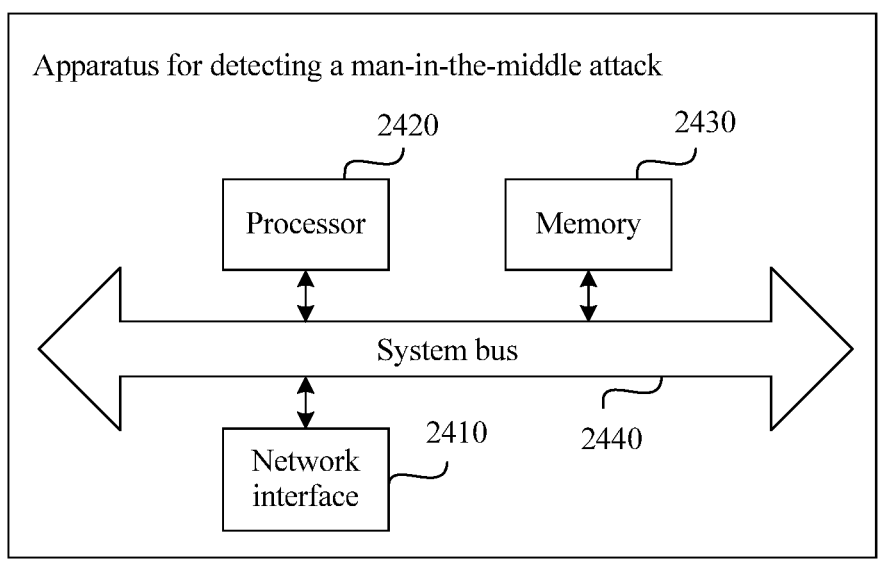
FIG. 24 is a schematic structural diagram of hardware of an apparatus for detecting a man-in-the-middle attack according to Embodiment 21 of the present disclosure.

In addition, the apparatus for detecting a man-in-the-middle attack provided in Embodiment 12 of the present disclosure may also be implemented in the following manner in order to implement the foregoing method for detecting a man-in-the-middle attack in Embodiment 3 of the present disclosure. As shown in FIG. 24, the apparatus for detecting a man-in-the-middle attack includes a network interface 2410, a processor 2420, a memory 2430 and a system bus

2440. The system bus 2440 is configured to connect the network interface 2410, the processor 2420, and the memory 2430.

The network interface 2410 is configured to perform interaction and communication with UE and an MeNB.

The memory 2430 may be a permanent memory, for example, a hard disk drive and a flash memory, and the memory 2430 is configured to store an application program, where the application program may be used to enable the processor 2420 to access and execute the instructions of receiving a second check request message sent by the MeNB, where the second check request message includes second identifier information corresponding to first identifier information of an ERAB, and the second identifier information is a DRB corresponding to the ERAB, obtaining the second identifier information corresponding to the first identifier information, and a second data packet count value corresponding to the second identifier information, and sending the second identifier information and the second data packet count value corresponding to the second identifier information to the MeNB such that the MeNB determines, according to a first data packet count value and the second data packet count value, whether a man-in-the-middle attack exists.

In addition, as shown in FIG. 23, the apparatus for detecting a man-in-the-middle attack provided in Embodiment 15 of the present disclosure may also be implemented in the following manner in order to implement the foregoing method for detecting a man-in-the-middle attack in Embodiment 6 of the present disclosure.

The memory 2330 may be a permanent memory, for example, a hard disk drive and a flash memory, and the memory 2330 is configured to store an application program, where the application program may be used to enable the processor 2320 to access and execute the instructions of receiving a second check request message sent by an MeNB, where the second check request message includes second identifier information corresponding to first identifier information of an ERAB, and a first data packet count value corresponding to the first identifier information, and the second identifier information is a DRB corresponding to the ERAB, obtaining the second identifier information corresponding to the first identifier information, and a second data packet count value corresponding to the second identifier information, determining, according to the first data packet count value corresponding to the first identifier information, and the second data packet count value corresponding to the second identifier information, whether a man-in-the-middle attack exists between an SeNB and the apparatus, and generating a check response message according to a result of the determining, and sending the check response message to the MeNB.

The application program stored in the memory 2430 further includes an instruction that may be used to enable the processor 2420 to execute a process of determining, according to the first data packet count value corresponding to the first identifier information, and the second data packet count value corresponding to the second identifier information, whether a man-in-the-middle attack exists between an SeNB and the apparatus determining that no man-in-the-middle attack exists between the SeNB and the apparatus when the first data packet count value corresponding to the first identifier information is the same as the second data packet count value corresponding to the second identifier information, or determining that a man-in-the-middle attack exists between the SeNB and the apparatus when the first data packet count value corresponding to the first identifier information is different from the second data packet count value corresponding to the second identifier information.

In addition, as shown in FIG. 23, the apparatus for detecting a man-in-the-middle attack provided in Embodiment 18 of the present disclosure may also be implemented in the following manner in order to implement the foregoing method for detecting a man-in-the-middle attack in Embodiment 9 of the present disclosure.

The memory 2330 may be a permanent memory, for example, a hard disk drive and a flash memory, and the memory 2330 is configured to store an application program, where the application program may be used to enable the processor 2320 to access and execute the instructions of receiving a second check request message sent by an MeNB, obtaining, according to the second check request message, first identifier information of a DRB and a first data packet count value corresponding to the first identifier information, and sending a check response message to the MeNB, where the check response message includes the first identifier information and the first data packet count value corresponding to the first identifier information such that the MeNB sends the check response message to an SeNB, and the SeNB determines, according to the first data packet count value, whether a man-in-the-middle attack exists between the SeNB and the apparatus.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A method for detecting a man-in-the-middle attack, comprising:
   receiving, by a macro evolved Node B (MeNB), a first check request message from a secondary evolved Node B (SeNB), wherein the first check request message comprises first identifier information of an evolved random access bearer (ERAB) and a first data packet count value corresponding to the first identifier information;

obtaining by the MeNB, second identifier information that matches the first identifier information, wherein the second identifier information is an identifier of data radio bearer (DRB) corresponding to the ERAB;

sending, by the MeNB, a second check request message to a user terminal, wherein the second check request message comprises the second identifier information; and a second data packet count value corresponding to the second identifier information;

receiving, by the MeNB, a first check response message from the user terminal according to the second check request message, wherein the first check response message comprises the second identifier information and the second data packet count value;

determining, by the MeNB, that no man-in-the-middle attack exists between the SeNB and the user terminal when the first data packet count value corresponding to the first identifier information is the same as the second data packet count value corresponding to the second identifier information; and determining, by the MeNB, that the man-in-the-middle attack exists between the SeNB and the user terminal when the first data packet count value corresponding to the first identifier information is different from the second data packet count value corresponding to the second identifier information.

2. The method of claim 1, wherein the first check request message further comprises an identifier of the SeNB, and wherein the second check request message is generated according to the first identifier information and the identifier of the SeNB.

3. The method of claim 1, wherein the first check request message comprises at least two pieces of first identifier information and at least two corresponding first data packet count values, wherein the first check response message comprises at least two pieces of second identifier information and at least two corresponding second data packet count values, wherein determining that the man-in-the-middle attack exists between the SeNB and the user terminal comprises determining, by the MeNB, that the man-in-the-middle attack exists between the SeNB and the user terminal when a first data packet count value corresponding to at least one piece of first identifier information is different from the second data packet count value corresponding to the second identifier information that matches the first identifier information, and wherein determining that no man-in-the-middle attack exists between the SeNB and the user terminal further comprises determining, by the MeNB, that no man-in-the-middle attack exists between the SeNB and the user terminal when the first data packet count values corresponding to all the first identifier information are the same as the second data packet count value corresponding to the second identifier information that matches the first identifier information.

4. The method of claim 1, wherein after the MeNB determines that no man-in-the-middle attack exists between the SeNB and the user terminal, the method further comprises sending, by the MeNB, a second check response message to the SeNB, wherein the second check response message comprises second indication information, and wherein the second indication information is used to indicate that no man-in-the-middle attack exists between the SeNB and the user terminal.

5. The method of claim 1, wherein after the MeNB determines that the man-in-the-middle attack exists between the SeNB and the user terminal, the method further comprises sending, by the MeNB, an exception report to a mobility management entity (MME) or an operation and maintenance (O&M) server.

6. The method of claim 1, wherein after the MeNB determines that the man-in-the-middle attack exists between the SeNB and the user terminal, the method further comprises sending, by the MeNB, a third check response message to the SeNB, wherein the third check response message comprises third indication information, and wherein the third indication information is used to indicate that the man-in-the-middle attack exists between the SeNB and the user terminal.

7. A method for detecting a man-in-the-middle attack, comprising:

receiving, by a user terminal, a second check request message from a macro evolved Node B (MeNB), wherein the second check request message comprises:
second identifier information corresponding to first identifier information of an evolved random access bearer (ERAB); and
a first data packet count value corresponding to the first identifier information, wherein the second identifier information is a data radio bearer (DRB) corresponding to the ERAB;

obtaining, by the user terminal, the second identifier information corresponding to the first identifier information and a second data packet count value corresponding to the second identifier information;

determining, by the user terminal according to the first data packet count value corresponding to the first identifier information and the second data packet count value corresponding to the second identifier information, whether the man-in-the-middle attack exists between a secondary evolved Node B (SeNB) and the user terminal;

generating, by the user terminal, a check response message according to a result of the determining; and sending the check response message to the MeNB.

8. The method of claim 7, wherein determining whether the man-in-the-middle attack exists between the SeNB and the user terminal further comprises:

determining, by the user terminal that no man-in-the-middle attack exists between the SeNB and the user terminal when the first data packet count value corresponding to the first identifier information is the same as the second data packet count value corresponding to the second identifier information; and determining, by the user terminal that the man-in-the-middle attack exists between the SeNB and the user terminal when the first data packet count value corresponding to the first identifier information is different from the second data packet count value corresponding to the second identifier information.

9. An apparatus for detecting a man-in-the-middle attack, comprising:
a receiver;
a transmitter;
a memory having instructions stored therein;
a processor coupled to the receiver, the transmitter, and the memory, wherein the processor executes the instructions to:
receive a first check request message from a secondary evolved Node B (SeNB), wherein the first check request message comprises first identifier information of an evolved random access bearer (ERAB) and a first data packet count value corresponding to the first identifier information;

obtain second identifier information that matches the first identifier information, wherein the second identifier information is an identifier of data radio bearer (DRB) corresponding to the ERAB; and send a second check request message to a user terminal, wherein the second check request message comprises the second identifier information and a second data packet count value corresponding to the second identifier information;

receive a first check response message from the user terminal according to the second check request message, wherein the first check response message comprises the second identifier information and the second data packet count value;

determine that no man-in-the-middle attack exists between the SeNB and the user terminal when the first data packet count value corresponding to the first identifier information is the same as the second data packet count value corresponding to the second identifier information; and determine that the man-in-the-middle attack exists between the SeNB and the user terminal when the first data packet count value corresponding to the first identifier information is different from the second data packet count value corresponding to the second identifier information.

10. The apparatus of claim 9, wherein the first check request message further comprises an identifier of the SeNB, and wherein the second check request message is generated according to the first identifier information and the identifier of the SeNB.

11. The apparatus of claim 9, wherein the first check request message comprises at least two pieces of first identifier information and at least two corresponding first data packet count values, wherein the first check response message comprises at least two pieces of second identifier information and at least two corresponding second data packet count values, and wherein the processor further executes the instructions to:

determine that the man-in-the-middle attack exists between the SeNB and the user terminal when a first data packet count value corresponding to at least one piece of first identifier information is different from the second data packet count value corresponding to the second identifier information that matches the first identifier information; and determine that no man-in-the-middle attack exists between the SeNB and the user terminal when the first data packet count values corresponding to all the first identifier information are the same as the second data packet count value corresponding to the second identifier information that matches the first identifier information.

12. The apparatus of claim 9, wherein the processor further executes the instructions to send a second check response message to the SeNB, wherein the second check response message comprises second indication information, and wherein the second indication information is used to indicate that no man-in-the-middle attack exists between the SeNB and the user terminal.

13. The apparatus of claim 9, wherein the processor further executes the instructions to send an exception report to a mobility management entity (MME) or an operation and maintenance (O&M) server.

14. The apparatus of claim 9, wherein the processor further executes the instructions to send a third check response message to the SeNB, wherein the third check response message comprises third indication information, and wherein the third indication information is used to indicate that the man-in-the-middle attack exists between the SeNB and the user terminal.

15. An apparatus for detecting a man-in-the-middle attack, comprising:
a receiver;
a transmitter;
a memory having instructions stored therein;
a processor coupled to the receiver, the transmitter, and the memory, wherein the processor executes the instructions to:
receive a second check request message from a macro evolved Node B (MeNB), wherein the second check request message comprises;
second identifier information corresponding to first identifier information of an evolved random access bearer (ERAB); and
a first data packet count value corresponding to the first identifier information, wherein the second identifier information is a data radio bearer (DRB) corresponding to the ERAB;
obtain the second identifier information corresponding to the first identifier information and a second data packet count value corresponding to the second identifier information;
determine, according to the first data packet count value corresponding to the first identifier information and the second data packet count value corresponding to the second identifier information, whether the man-in-the-middle attack exists between a secondary evolved Node B (SeNB) and the apparatus;
generate a check response message according to a result determined by the processor; and
send the check response message to the MeNB.

16. The apparatus of claim 15, wherein the processor further executes the instructions to:
determine that no man-in-the-middle attack exists between the SeNB and the apparatus when the first data packet count value corresponding to the first identifier information is the same as the second data packet count value corresponding to the second identifier information; and
determine that the man-in-the-middle attack exists between the SeNB and the apparatus when the first data packet count value corresponding to the first identifier information is different from the second data packet count value corresponding to the second identifier information.

17. The method of claim 1, wherein the first indication information is used to instruct the user terminal to obtain the second identifier information that matches the first identifier information from the SeNB.

18. The method of claim 7, wherein the second identifier information corresponding to the first identifier information is obtained from the SeNB.

19. The apparatus of claim 9, wherein the first indication information is used to instruct the user terminal to obtain the second identifier information that matches the first identifier information from the SeNB.

20. The apparatus of claim 15, wherein the second identifier information corresponding to the first identifier information is obtained from the SeNB.

* * * * *

UNITED STATES PATENT AND TRADEMARK OFFICE
CERTIFICATE OF CORRECTION

PATENT NO. : 10,362,043 B2  
APPLICATION NO. : 15/270722  
DATED : July 23, 2019  
INVENTOR(S) : Rong Wu, Chengdong He and Lu Gan Page 1 of 1

It is certified that error appears in the above-identified patent and that said Letters Patent is hereby corrected as shown below:

On the Title Page

Page 2, Column 2, Item (56), OTHER PUBLICATIONS, Line 9: should read "S3-140028, Revision of S3-13abcd, Jan. 20-24, 2014, 1 pages."

Signed and Sealed this  
Seventeenth Day of September, 2019

Andrei Iancu  
*Director of the United States Patent and Trademark Office*